US010816423B2

(12) United States Patent
Tokuda

(10) Patent No.: US 10,816,423 B2
(45) Date of Patent: Oct. 27, 2020

(54) PRESSURE SENSOR CHIP AND PRESSURE TRANSMITTER HAVING A STRAIN GAUGE ARRANGEMENT BEING DISPOSED IN A REGION OF THE DIAPHRAGM

(71) Applicant: AZBIL CORPORATION, Chiyoda-ku (JP)

(72) Inventor: Tomohisa Tokuda, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 346 days.

(21) Appl. No.: 15/926,353

(22) Filed: Mar. 20, 2018

(65) Prior Publication Data
US 2018/0275001 A1 Sep. 27, 2018

(30) Foreign Application Priority Data

Mar. 22, 2017 (JP) .................................. 2017-056192

(51) Int. Cl.
G01L 9/06 (2006.01)
G01L 1/22 (2006.01)
(52) U.S. Cl.
CPC .............. G01L 9/06 (2013.01); G01L 1/2287 (2013.01)
(58) Field of Classification Search
None
See application file for complete search history.

(56) References Cited

U.S. PATENT DOCUMENTS 6,038,933 A * 3/2000 Meyer .................. G01L 1/2206
73/146
6,675,656 B1 * 1/2004 Plochinger ............. G01L 1/142
73/718
(Continued)

FOREIGN PATENT DOCUMENTS

JP 2002-208708 A 7/2002
JP 2005-069736 3/2005
(Continued)

OTHER PUBLICATIONS

Office Action dated Apr. 15, 2019 in corresponding Korean Patent Application No. 10-2018-0031564 (with English Translation), 11 pages.

(Continued)

Primary Examiner — Natalie Huls
Assistant Examiner — Jermaine L Jenkins
(74) Attorney, Agent, or Firm — Oblon, McClelland, Maier & Neustadt, L.L.P.

(57) ABSTRACT

A pressure sensor chip includes a first layer including a pressure introduction channel opening on a first main surface and a second main surface; a second layer including a diaphragm covering one end of the channel, a first strain gauge, and a second strain gauge, the second layer being on the second main surface; and a third layer including a third main surface and a concaved portion disposed at the third main surface, the third main surface being on the second layer. The concaved portion faces the channel with the diaphragm interposed therebetween, and is on an inner side of the channel when viewed from a direction perpendicular to the first main surface. The first strain gauge is on an outer side of the concaved portion when viewed from the direction. The second strain gauge is on an inner side of the first strain gauge when viewed from the direction.

7 Claims, 17 Drawing Sheets

(56) References Cited

U.S. PATENT DOCUMENTS

| | | | |
|---|---|---|---|
| 6,688,185 B2* | 2/2004 | Knox | B60N 2/002 |
| | | | 73/768 |
| 6,933,732 B2* | 8/2005 | Morimoto | G01L 1/142 |
| | | | 324/661 |
| 7,360,431 B2* | 4/2008 | Yoneda | G01L 19/0618 |
| | | | 361/283.1 |
| 9,250,142 B2* | 2/2016 | Fukuzawa | B81B 3/0086 |
| 9,342,179 B2* | 5/2016 | Fuji | G01L 9/16 |
| 9,853,209 B2* | 12/2017 | Fuji | H01L 43/12 |
| 10,101,232 B2* | 10/2018 | Tham | G01L 19/0618 |
| 10,209,830 B2* | 2/2019 | Pedder | G01L 1/18 |
| 10,345,163 B2* | 7/2019 | Iesato | G01L 1/225 |
| 2011/0247421 A1 | 10/2011 | Tokuda et al. | |
| 2014/0102208 A1 | 4/2014 | Tokuda et al. | |
| 2015/0114129 A1 | 4/2015 | Chen | |

FOREIGN PATENT DOCUMENTS

| | | |
|---|---|---|
| KR | 10-2011-0114457 A | 10/2011 |
| KR | 10-2014-0048050 A | 4/2014 |

OTHER PUBLICATIONS

Japanese Office Action dated May 12, 2020 in Japanese Patent Application No. 2017-056192 (with English translation), 8 pages.

* cited by examiner

PRESSURE SENSOR CHIP AND PRESSURE TRANSMITTER HAVING A STRAIN GAUGE ARRANGEMENT BEING DISPOSED IN A REGION OF THE DIAPHRAGM

CROSS-REFERENCE TO RELATED APPLICATIONS

The present application is based on and claims priority to Japanese Application No. 2017-056192, filed Mar. 22, 2017, the entire contents of which are incorporated herein by reference.

BACKGROUND

1. Field

The present disclosure relates to a pressure sensor chip, a pressure transmitter, and a method for manufacturing a pressure sensor chip, and specifically relates to, for example, a one-chip pressure sensor chip having a wide pressure measurement range and a pressure transmitter including the pressure sensor chip.

2. Description of the Related Art

Pressure transmitters have been available as devices for measuring fluid pressure in various process systems. For example, Japanese Unexamined Patent Application Publication No. 2005-69736 discloses a pressure transmitter including a pressure sensor chip that, when a pressure of a fluid as a target to be measured is applied to one surface of a diaphragm formed of a thin film provided with a piezoresistance element serving as a strain gauge, converts a change in the resistance value of the piezoresistance element caused by stress based on a displacement of the diaphragm that has received the pressure into an electric signal and outputs the electric signal.

In a typical pressure sensor chip, sensitivity for detecting a pressure and pressure resistance, that is, a pressure measurement range, is determined by the aspect ratio of a diaphragm. Thus, with a plurality of diaphragms having different aspect ratios being formed on one sensor chip, a one-chip multivariable sensor capable of measuring a plurality of pressures can be commercialized.

For example, Japanese Unexamined Patent Application Publication No. 2005-69736 discloses a one-chip differential pressure/static pressure sensor chip including a differential pressure diaphragm that is formed at a center portion of a substrate and that detects a difference between two pressures and a static pressure diaphragm that is formed at an outer periphery of the differential pressure diaphragm in the substrate and that detects only one of the two pressures. In this differential pressure/static pressure sensor chip, a pressure introduced to one surface of the differential pressure diaphragm among the two pressures to be measured is branched to be introduced to the static pressure diaphragm, and accordingly the one pressure (static pressure) can be detected as well as the differential pressure between the two pressures.

With the chip structure disclosed in Japanese Unexamined Patent Application Publication No. 2005-69736, in which a plurality of diaphragms are disposed on the same substrate, a multivariable sensor capable of detecting both a differential pressure and a static pressure can be commercialized as described above, but it is not easy to commercialize a multivariable sensor having multiple measurement ranges for static pressure and a multivariable sensor having multiple measurement ranges for differential pressure.

For example, in a pressure sensor chip having a chip structure in which a low-pressure detecting diaphragm for detecting a low pressure and a high-pressure detecting diaphragm for detecting a high pressure are disposed on the same substrate and a pressure to be measured is introduced to the individual diaphragms by branching the pressure, if a high pressure that can be detected by the high-pressure detecting diaphragm is applied, the same pressure may be applied to the low-pressure detecting diaphragm and the low-pressure detecting diaphragm may get broken.

SUMMARY

The present disclosure has been made in view of the above-described issues and is directed to providing a pressure sensor chip having a new chip structure capable of achieving multiple measurement ranges.

A pressure sensor chip (1) that detects a pressure of a fluid as a target to be measured according to the present disclosure includes a first layer (11) including a first main surface, a second main surface opposite to the first main surface, and a pressure introduction channel (111) that opens on the first main surface and the second main surface; a second layer (12) including a diaphragm (124) that covers one end of the pressure introduction channel, a first strain gauge (125), and a second strain gauge (126), the second layer being disposed on the second main surface of the first layer; and a third layer (13) including a third main surface and a concaved portion (131) that is disposed at the third main surface, the third main surface being disposed on the second layer. The concaved portion faces the pressure introduction channel with the diaphragm interposed therebetween. The concaved portion is disposed on an inner side of the pressure introduction channel when viewed from a direction perpendicular to the first main surface (Z direction). The first strain gauge is disposed, in a region functioning as the diaphragm of the second layer, on an outer side of the concaved portion when viewed from the direction perpendicular to the first main surface. The second strain gauge is disposed, in the region functioning as the diaphragm of the second layer, on an inner side of the first strain gauge when viewed from the direction perpendicular to the first main surface.

In the pressure sensor chip, the first strain gauge may be disposed at a peripheral portion (113a) of the pressure introduction channel when viewed from the direction perpendicular to the first main surface, and the second strain gauge may be disposed at a peripheral portion (131a) of the concaved portion when viewed from the direction perpendicular to the first main surface.

In the pressure sensor chip, the third layer may include third layers (13_1 to 13_n) laminated on the second layer, the number of the third layers being n, which is an integer of 2 or more. The concaved portion of the third layer that is i-th from the second layer may have a larger opening area than the concaved portion of the third layer that is (i−1)-th from the second layer, i being larger than 1 and smaller than or equal to n. The second strain gauge may include second strain gauges (126_1 to 126_3) each corresponding to one of the third layers. The first strain gauge (125) may be disposed, in the region functioning as the diaphragm of the second layer, on an outer side of the concaved portion (131_3) of the third layer that is n-th from the second layer when viewed from the direction perpendicular to the first main surface. The second strain gauge (126_3) corresponding to the n-th third layer may be disposed, in the region functioning as the diaphragm of the second layer, on an inner side of the first strain gauge and on an outer side of the concaved portion (131_2) of the third layer that is (n−1)-th from the second layer when viewed from the direction perpendicular to the first main surface. The second strain gauge (126_2) corresponding to the third layer that is j-th from the second layer, j being larger than 1 and smaller than n, may be disposed, in the region functioning as the diaphragm of the second layer, on an inner side of the second strain gauge corresponding to the third layer that is (j+1)-th from the second layer and on an outer side of the concaved portion (131_1) of the third layer that is (j−1)-th from the second layer when viewed from the direction perpendicular to the first main surface. The second strain gauge (126_1) corresponding to the third layer that is first from the second layer may be disposed, in the region functioning as the diaphragm of the second layer, on an inner side of the second strain gauge (126_2) corresponding to the third layer that is second from the second layer when viewed from the direction perpendicular to the first main surface.

In the pressure sensor chip, the second strain gauge (126_1 to 126_3) corresponding to the third layer that is k-th from the second layer, k being larger than or equal to 1 and smaller than or equal to n, may be disposed, in the region functioning as the diaphragm of the second layer, at a peripheral portion (131a_1 to 131a_3) of the concaved portion of the k-th third layer when viewed from the direction perpendicular to the first main surface, and the first strain gauge may be disposed, in the region functioning as the diaphragm of the second layer, at a peripheral portion (113a) of the pressure introduction channel when viewed from the direction perpendicular to the first main surface.

In the pressure sensor chip, the third layer may further include a hole (134) that communicates with the concaved portion.

In the pressure sensor chip, the peripheral portion of the pressure introduction channel may have an arc-shaped cross section when viewed from a direction parallel to the first main surface.

According to the present disclosure, a pressure sensor chip having a chip structure capable of achieving multiple measurement ranges can be provided.

DETAILED DESCRIPTION

Figure 1A:
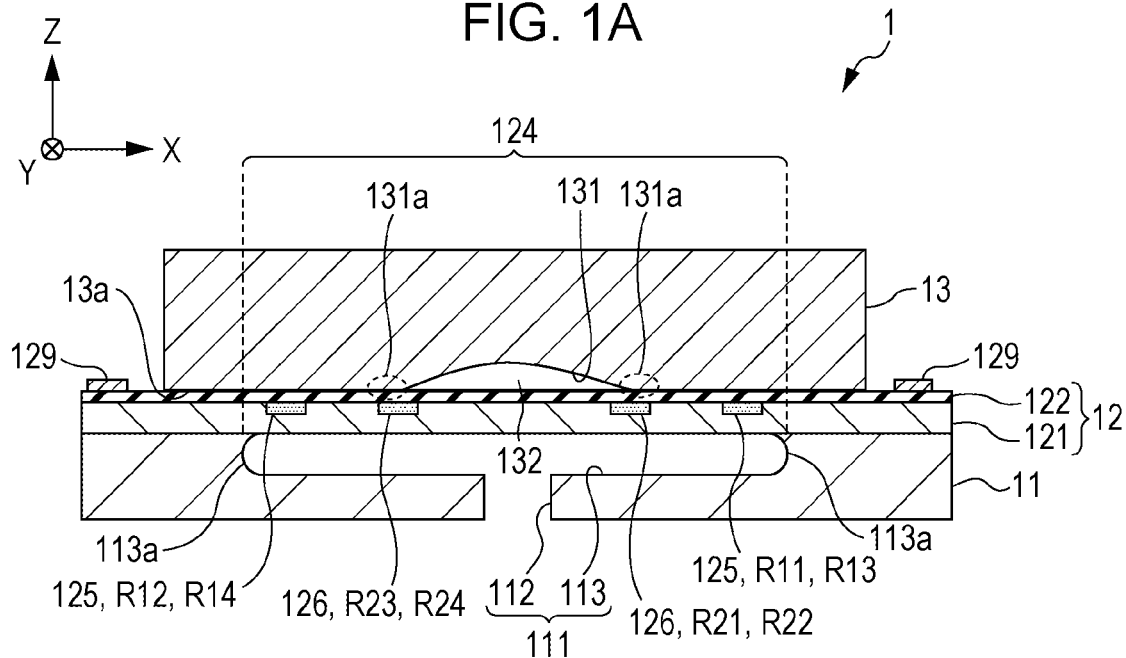
FIG. 1A is a diagram schematically illustrating the cross-sectional shape of a pressure sensor chip according to a first embodiment of the present disclosure.

Hereinafter, embodiments of the present disclosure will be described with reference to the attached drawings. In the following description, elements that are common in the individual embodiments are denoted by the same reference numerals, and a repetitive description will not be given.

First Embodiment

1. Configuration of Pressure Sensor Chip 1 According to First Embodiment

Figure 1B:
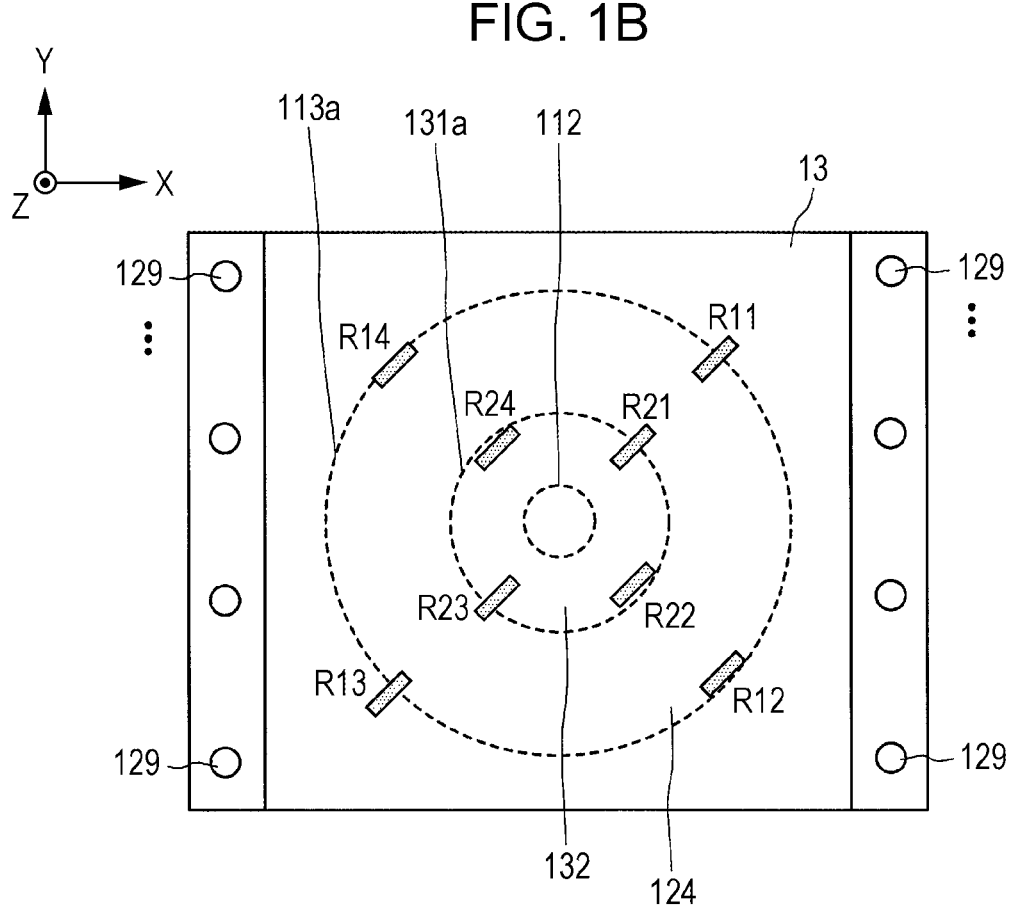
FIG. 1B is a diagram schematically illustrating the plane shape of the pressure sensor chip according to the first embodiment of the present disclosure.

FIGS. 1A and 1B are diagrams illustrating the configuration of a pressure sensor chip 1 according to a first embodiment of the present disclosure. FIG. 1A schematically illustrates the cross-sectional shape of the pressure sensor chip 1 according to the first embodiment, and FIG. 1B schematically illustrates the plane shape of the pressure sensor chip 1 according to the first embodiment.

The pressure sensor chip 1 illustrated in FIGS. 1A and 1B detects a pressure (static pressure) of a fluid as a target to be measured and has a structure in which a high-pressure detecting strain gauge and a low-pressure detecting strain gauge are disposed in one diaphragm. Specifically, the pressure sensor chip 1 has a structure in which a first layer 11 for introducing a pressure, a second layer 12 functioning as a diaphragm, and a third layer 13 that limits deformation of the diaphragm in one direction are laminated one on top of another.

In the following description, it is assumed that, in a three-dimensional space defined by an X-axis, a Y-axis, and a Z-axis, the main surfaces of the first layer 11, the second layer 12, and the third layer 13 are arranged so as to be parallel to the X-Y plane and perpendicular to the Z-axis.

The first layer 11 is made of silicon, for example. The first layer 11 includes a pressure introduction channel 111 for introducing a pressure of a fluid as a target to be measured. In a case where the pressure sensor chip 1 is mounted on a meter body, for example, the pressure introduction channel 111 receives a pressure of a fluid as a target to be measured from a pressure introduction tube or the like included in the meter body.

The pressure introduction channel 111 is a through hole extending through a main surface 11a of the first layer 11 and a main surface 11b opposite to the main surface 11a. The pressure introduction channel 111 is made up of a first hole 112 and a second hole 113. The first hole 112 is a hole for introducing a pressure of a fluid as a target to be measured from the outside. The second hole 113 is a hole for introducing the pressure from the first hole 112 so as to apply the pressure to an overall diaphragm 124, which will be described below. The second hole 113 has a larger opening area than the first hole 112.

The second layer 12 is disposed on the main surface 11b of the first layer 11 so as to cover at least the pressure instruction channel 111. The second layer 12 is made up of an active layer (for example, a silicon (Si) layer) 121 disposed on the main surface 11b of the first layer 11 and an insulating layer (for example, a silicon oxide ($SiO_2$) layer) 122 disposed on the active layer 121. As an example of specific dimensions, the active layer 121 has a thickness (the length in the Z direction) of 10 to 20 µm, and the insulating layer 122 has a thickness of 0.15 µm.

In the second layer 12, a region that covers the pressure introduction channel 111 (the second hole 113) functions as a diaphragm. Hereinafter, the region that covers the pressure introduction channel 111 in the second layer 12 will be referred to as a diaphragm 124.

In the region functioning as the diaphragm 124 in the second layer 12, a low-pressure detecting strain gauge 126 and a high-pressure detecting strain gauge 125 are disposed, each serving as a pressure-sensitive element that detects a pressure applied to the diaphragm 124. The details of the low-pressure detecting strain gauge 126 and the high-pressure detecting strain gauge 125 will be described below.

The third layer 13 is disposed on the second layer 12 so as to cover the diaphragm 124. Specifically, the third layer 13 includes a main surface 13a, which is bonded onto the insulating layer 122 of the second layer 12.

A stopper portion 131 is disposed at the main surface 13a of the third layer 13. The stopper portion 131 faces the pressure introduction channel 111 with the diaphragm 124 interposed therebetween. The stopper portion 131 is a concaved portion (recess) disposed at the main surface 13a, which is a bonding surface for the third layer 13 and the diaphragm 124, in a direction perpendicular to the bonding surface (Z direction). The stopper portion 131 faces the pressure introduction channel 111 with the diaphragm 124 interposed therebetween. The concaved portion serving as the stopper portion 131 includes a curved surface (for example, an aspherical surface) along displacement of the diaphragm 124.

Figure 2:
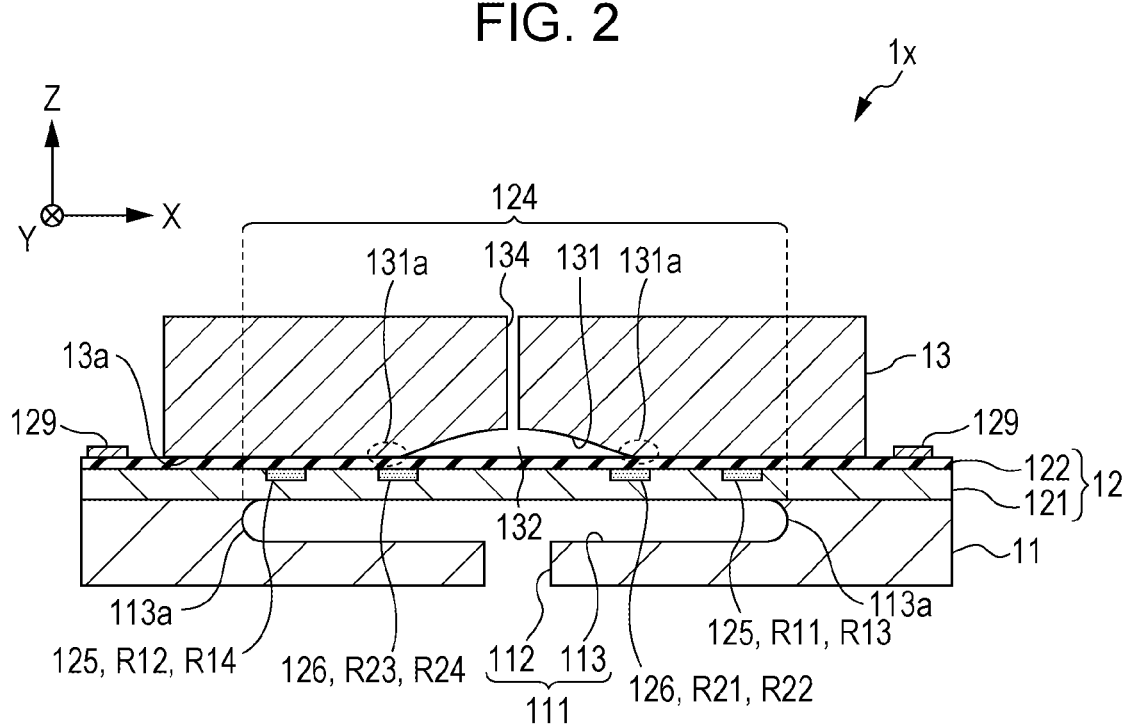
FIG. 2 is a diagram schematically illustrating the cross-sectional shape of the pressure sensor chip in a case where an atmospheric pressure is used as a reference pressure.

A chamber 132 is disposed between the stopper portion 131 and the diaphragm 124. The chamber 132 is a space for introducing a reference pressure in pressure measurement. For example, in the case of measuring a pressure of a fluid in vacuum, the chamber 132 is a vacuum space enclosed with the stopper portion 131 and the diaphragm 124, as illustrated in FIG. 1A. For another example, in the case of measuring a pressure of a fluid in atmospheric pressure, a hole (communication channel) 134 connected to the chamber 132 may be disposed as in a pressure sensor chip 1X illustrated in FIG. 2 and an atmospheric pressure may be introduced through the hole 134.

The stopper portion 131 is a functional portion that, if a pressure is applied to the diaphragm 124 from the pressure introduction channel 111 in the first layer 11 and if the diaphragm 124 bends, allows the diaphragm 124 to land on the stopper portion 131, thereby limiting deformation of the diaphragm 124 in one direction. Accordingly, breakdown of the diaphragm 124, which may be caused by an excessive pressure applied to the diaphragm 124, can be prevented.

Now, a detailed description will be given of the low-pressure detecting strain gauge 126 and the high-pressure detecting strain gauge 125.

As illustrated in FIGS. 1A and 1B, the low-pressure detecting strain gauge 126 includes resistors R21 to R24. The high-pressure detecting strain gauge 125 includes resistors R11 to R14. The resistors R11 to R14 and R21 to R24 are, for example, diffused resistors disposed on the insulating layer 122 side in the active layer 121.

Figure 3A:
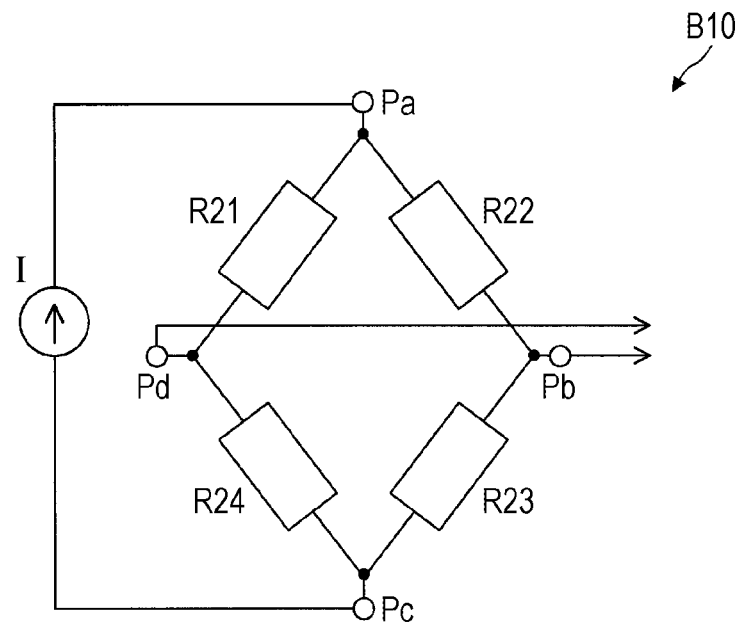
FIG. 3A is a diagram illustrating the configuration of a low-pressure detecting bridge circuit.
Figure 3B:
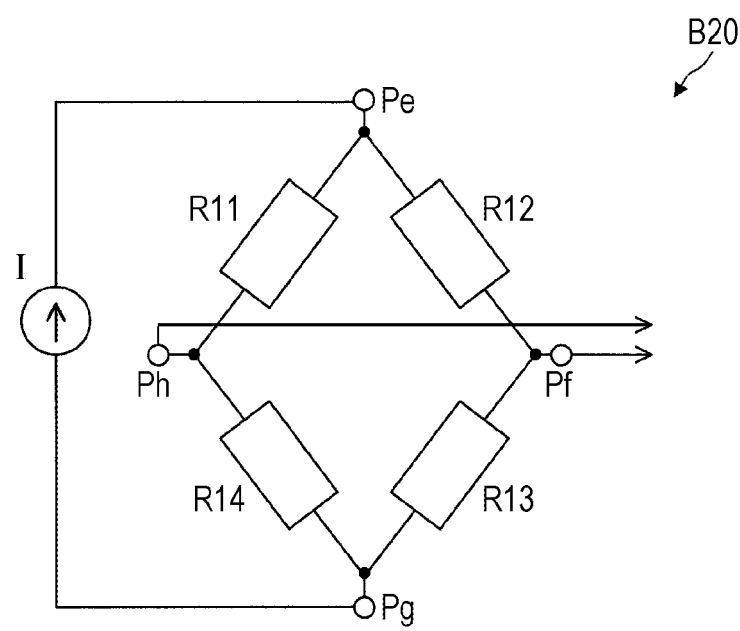
FIG. 3B is a diagram illustrating the configuration of a high-pressure detecting bridge circuit.

As illustrated in FIGS. 3A and 3B, the resistors R21 to R24 constitute a low-pressure detecting bridge circuit B10, and the resistors R11 to R14 constitute a high-pressure detecting bridge circuit B20. The nodes of the low-pressure detecting bridge circuit B10 and the nodes of the high-pressure detecting bridge circuit B20 are respectively connected to terminals Pa to Pd and terminals Pe to Ph through wiring patterns (not illustrated) formed of the diffused resistors disposed on the insulating layer 122 side in the active layer 121, for example. The terminals Pa to Pd and the terminals Pe to Ph serve as a plurality of electrode pads 129 disposed on the insulating layer 122, for example.

In the pressure sensor chip 1, in a state where a constant current flows through the terminals Pa and Pc of the low-pressure detecting bridge circuit B10, a change in resistance values of the resistors R21 to R24 caused by stress produced in the second layer 12 is detected as a change in voltage from the terminals Pb and Pd, so that a pressure (low pressure) of a fluid as a target to be measured applied to the diaphragm 124 can be measured.

Likewise, in a state where a constant current flows through the terminals Pe and Pg of the high-pressure detecting bridge circuit B20, a change in resistance values of the resistors R11 to R14 caused by stress produced in the second layer 12 is detected as a change in voltage from the terminals Pf and Ph, so that a pressure (high pressure) of a fluid as a target to be measured applied to the diaphragm 124 can be measured.

As illustrated in FIGS. 1A and 1B, the resistors R11 to R14 constituting the high-pressure detecting strain gauge 125 are disposed on the outer side of the stopper portion 131 when viewed from a direction perpendicular to the main surfaces 11a and 11b of the first layer 11 (Z direction). Specifically, the resistors R11 to R14 are disposed at positions where the stress in a peripheral portion of the diaphragm 124 peaks in a case where a pressure is applied to a pressure reception surface (the surface facing the pressure introduction channel 111) of the diaphragm 124, a surface opposite to the pressure reception surface of the diaphragm 124 (the third layer 13 side) lands on the stopper portion 131, and then a pressure is further applied to the pressure reception surface of the diaphragm 124. For example, the resistors R11 to R14 are disposed at a peripheral portion of the pressure introduction channel 111, that is, near an edge 113a of the second hole 113, when viewed from the Z direction.

On the other hand, the resistors R21 to R24 constituting the low-pressure detecting strain gauge 126 are disposed on the inner side of the high-pressure detecting strain gauge 125 in the diaphragm 124 when viewed from the direction perpendicular to the main surfaces 11a and 11b of the first layer 11 (Z direction). Specifically, the resistors R21 to R24 are disposed at positions where the stress in the diaphragm 124 peaks during a period from when a pressure is applied to the pressure reception surface of the diaphragm 124 to when the surface opposite to the pressure reception surface of the diaphragm 124 lands on the stopper portion 131. For example, the resistors R21 to R24 are disposed at a peripheral portion of the stopper portion 131, that is, near an edge 131a of the stopper portion 131, when viewed from the Z direction.

2. Operation of Pressure Sensor Chip 1

The pressure sensor chip 1 having the above-described structure operates in the following manner.

In the pressure sensor chip 1, for example, if a pressure higher than a pressure in the chamber 132 is introduced from the pressure introduction channel 111, the diaphragm 124 is displaced in the +Z direction (toward the third layer 13). The displacement of the diaphragm 124 produces stress therein, which is applied to the resistors P21 to R24 constituting the low-pressure detecting bridge circuit B10 disposed in the diaphragm 124, and accordingly the resistance values of the resistors R21 to R24 are changed. The change in the resistance values is output as electric signals (for example, voltages) from the terminals Pb and Pd of the low-pressure detecting bridge circuit B10, and thereby a pressure on a lower pressure side can be measured.

If the pressure applied from the pressure introduction channel 111 to the diaphragm 124 increases, the amount of displacement in the +Z direction of the diaphragm 124 increases in accordance with the pressure, and the diaphragm 124 lands on the stopper portion 131. Accordingly, displacement of the diaphragm 124 is limited and breakdown of the diaphragm 124 is prevented.

If the pressure applied to the diaphragm 124 further increases after the diaphragm 124 lands, the pressure is applied to the third layer 13 through the diaphragm 124. Accordingly, the third layer 13 is displaced in the +Z direction. The displacement of the third layer 13 produces stress in a region where the diaphragm 124 is bonded to the third layer 13. The stress is applied to the resistors R11 to R14 constituting the high-pressure detecting bridge circuit B20, and accordingly the resistance values of the resistors R11 to R14 are changed. The change in the resistance values is output as electric signals from the terminals Pf and Ph of the high-pressure detecting bridge circuit B20, and thereby a pressure on a higher pressure side can be measured.

3. Effect of Pressure Sensor Chip 1

As described above, the pressure sensor chip 1 according to the first embodiment of the present disclosure has a structure in which the single diaphragm 124 is sandwiched between the pressure introduction channel 111 and the stopper portion (concaved portion) 131 having a smaller opening area than the pressure introduction channel 111, the high-pressure detecting strain gauge 125 is disposed on the inner side of the pressure introduction channel 111 of the diaphragm 124 and on the outer side of the stopper portion 131 when viewed from the Z direction, and the low-pressure detecting strain gauge 126 is disposed on the inner side of the high-pressure detecting strain gauge 125 when viewed from the Z direction.

Specifically, during a period from when a pressure is applied from the pressure introduction channel 111 to the diaphragm 124 to when the diaphragm 124 lands on the stopper portion 131, the pressure sensor chip 1 is capable of measuring a low pressure by detecting a change in the resistance values of the resistors R21 to R24 constituting the low-pressure detecting bridge circuit B10 caused by the displacement of the diaphragm 124. After the pressure applied to the diaphragm 124 further increases and the diaphragm 124 lands on the stopper portion 131, the pressure sensor chip 1 is capable of measuring a high pressure by detecting a change in the resistance values of the resistors R11 to R14 constituting the high-pressure detecting bridge circuit B20 caused by the displacement of the third layer 13.

Therefore, with the pressure sensor chip 1 according to the first embodiment, multiple measurement ranges can be achieved by using a single diaphragm, and thus a multi-range pressure sensor having a wide measurement range can be commercialized.

Second Embodiment

1. Configuration of Pressure Sensor Chip 1A According to Second Embodiment

Figure 4A:
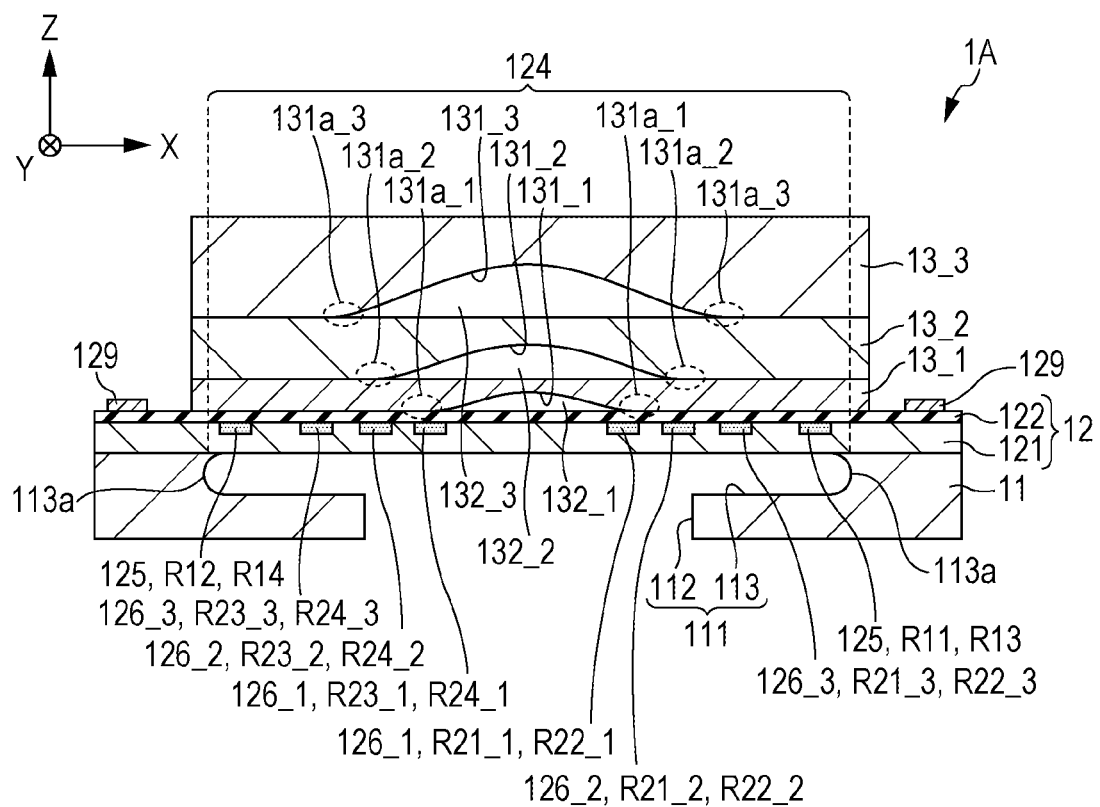
FIG. 4A is a diagram schematically illustrating the cross-sectional shape of a pressure sensor chip according to a second embodiment of the present disclosure.
Figure 4B:
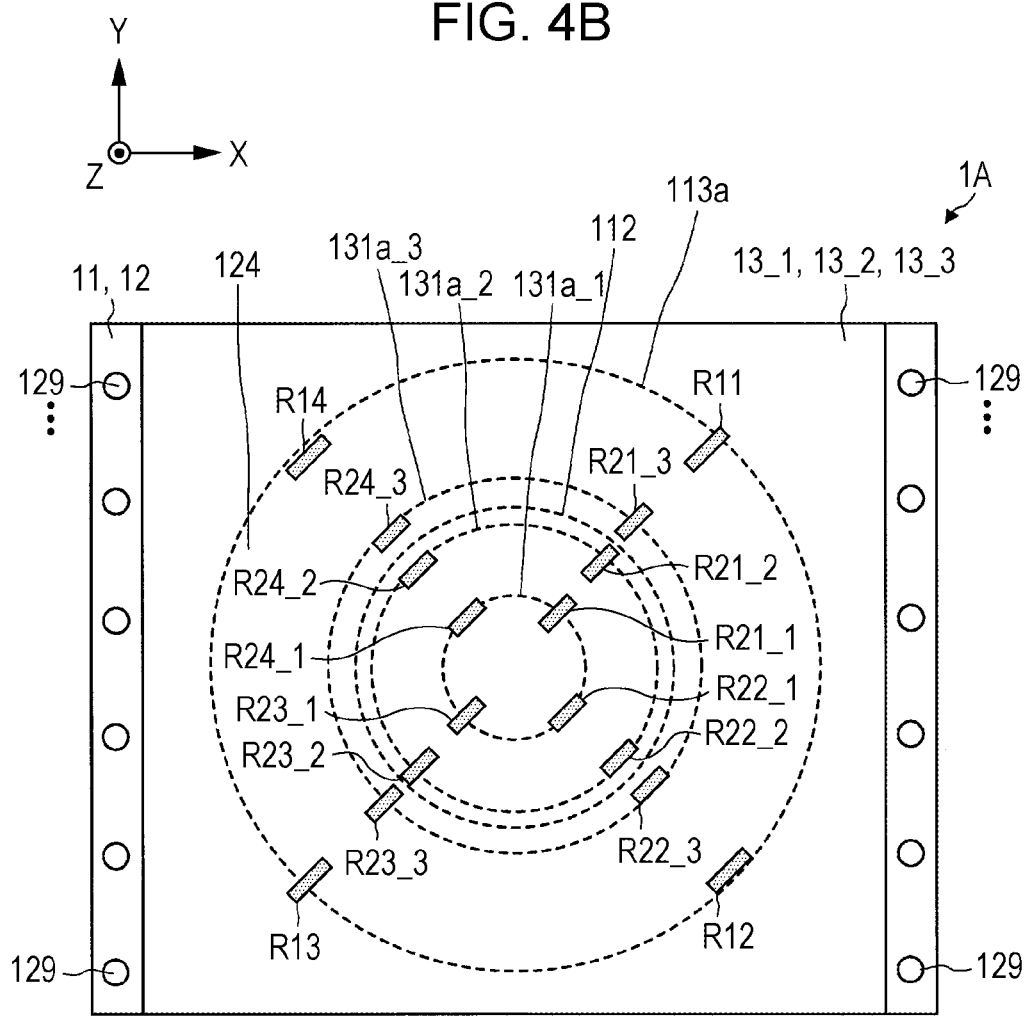
FIG. 4B is a diagram schematically illustrating the plane shape of the pressure sensor chip according to the second embodiment of the present disclosure.

FIGS. 4A and 4B are diagrams illustrating the configuration of a pressure sensor chip 1A according to a second embodiment of the present disclosure. FIG. 4A schematically illustrates the cross-sectional shape of the pressure sensor chip 1A according to the second embodiment, and FIG. 4B schematically illustrates the plane shape of the pressure sensor chip 1A according to the second embodiment.

The pressure sensor chip 1A illustrated in FIGS. 4A and 4B is different from the pressure sensor chip 1 according to the first embodiment in that a plurality of third layers 13 each including the stopper portion 131 are laminated one on top of another. In the other points, the pressure sensor chip 1A is the same as the pressure sensor chip 1 according to the first embodiment.

Among the elements of the pressure sensor chip 1A according to the second embodiment, the same elements as those of the pressure sensor chip 1 according to the first embodiment are denoted by the same reference numerals, and the detailed description thereof will not be given.

The pressure sensor chip 1A includes a plurality of third layers 13_1 to 13_n (n is an integer of 2 or more). The stopper portion 131 is disposed at one main surface of each of the third layers 13_1 to 13_n. Hereinafter, the stopper portions 131 disposed in the third layers 13_1 to 13_n will be referred to as stopper portions 131_1 to 131_n, respectively.

In this embodiment, it is assumed that n=3, for example. That is, a description will be given of a case where the three third layers 13_1 to 13_3 are laminated on the second layer 12.

A stopper portion 131_i of a third layer 13_i that is i-th (1<i≤n) from the second layer 12 has a larger opening area than a stopper portion 131_(i−1) of a third layer 13_(i−1) that is (i−1)-th from the second layer 12. Specifically, as illustrated in FIGS. 4A and 4B, the stopper portion 131_2 of the third layer 13_2 that is second from the second layer 12 has a larger opening area than the stopper portion 131-1 of the third layer 13_1 that is first from the second layer 12. Also, the stopper portion 131_3 of the third layer 13_3 that is third from the second layer 12 has a larger opening area than the stopper portion 131_2 of the third layer 13_2 that is second from the second layer 12. That is, in the pressure sensor chip 1A, the stopper portions 131_1 to 131_n have opening areas that increase in order from the diaphragm 124 side.

The pressure sensor chip 1A also includes pressure detecting strain gauges 126_1 to 126_n that correspond to the third layers 13_1 to 13_n, respectively, and that serve as second strain gauges. For example, the pressure sensor chip 1A includes pressure detecting strain gauges 126_1 to 126_3 corresponding to the third layers 13_1 to 13_3, respectively.

Figure 5A:
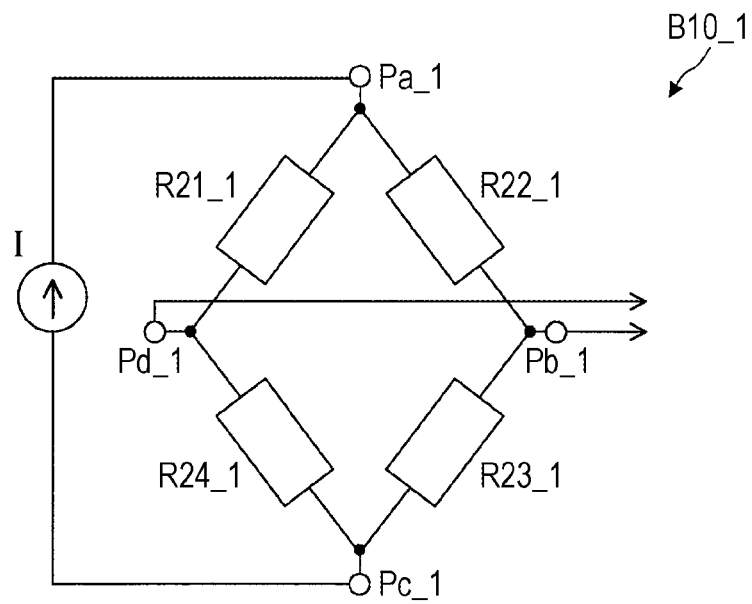
FIG. 5A is a diagram illustrating the configuration of a pressure detecting bridge circuit.
Figure 5B:
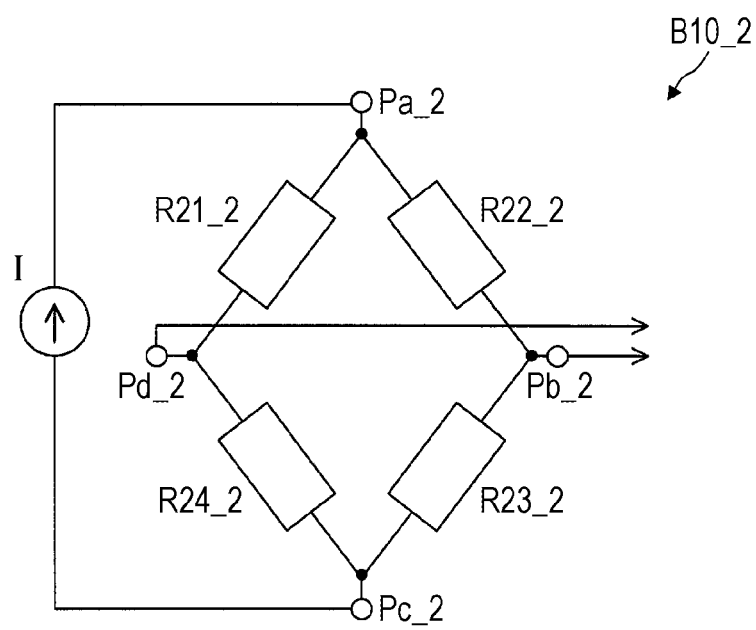
FIG. 5B is a diagram illustrating the configuration of a pressure detecting bridge circuit.
Figure 5C:
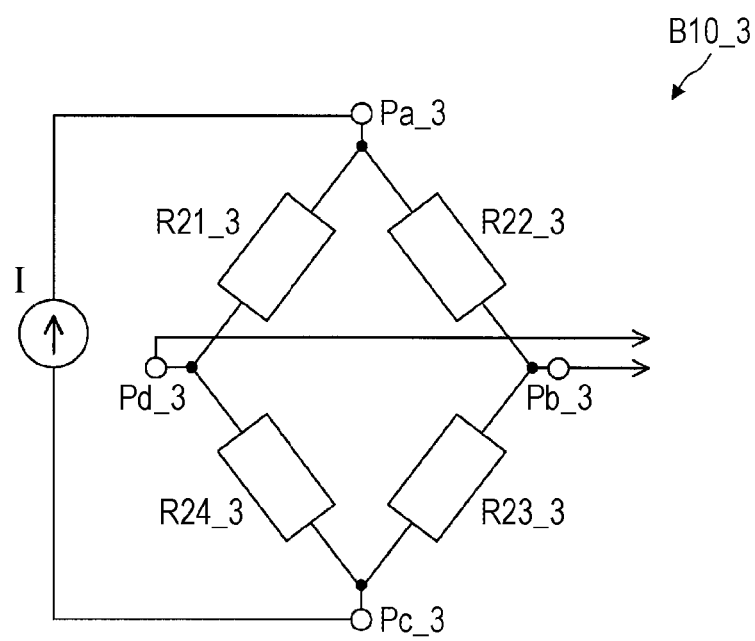
FIG. 5C is a diagram illustrating the configuration of a pressure detecting bridge circuit.

The pressure detecting strain gauges 126_1 to 126_3 each include, like the high-pressure detecting strain gauge 125 serving as a first strain gauge, four resistors constituting a bridge circuit. Specifically, as illustrated in FIGS. 5A to 5C, the pressure detecting strain gauge 126_1 includes resistors R21_1 to R24_1 constituting a pressure detecting bridge circuit B10_1, the pressure detecting strain gauge 126_2 includes resistors R21_2 to R24_2 constituting a pressure detecting bridge circuit B10_2, and the pressure detecting strain gauge 126_3 includes resistors R21_3 to R24_3 constituting a pressure detecting bridge circuit B10_3. The individual nodes of the pressure detecting bridge circuits B10_1 to B10_3 are connected to terminals Pa_1 to Pd_1, Pa_2 to Pd_2, and Pa_3 to Pd_3, respectively, through metal wiring patterns disposed on the insulating layer 122 of the second layer 12. The terminals Pa_1 to Pd_1, Pa_2 to Pd_2, and Pa_3 to Pd_3 serve as a plurality of electrode pads 129 disposed on the insulating layer 122, like the terminals Pe to Ph of the high-pressure detecting bridge circuit B20, for example.

The high-pressure detecting strain gauge 125 and the pressure detecting strain gauges 126_1 to 126_3 are respectively disposed in regions functioning as the diaphragm 124 of the second layer 12.

Specifically, the high-pressure detecting strain gauge 125 is disposed, in the region functioning as the diaphragm 124 of the second layer 12, on the outer side of the stopper portion 131_n of the third layer 13_n that is n-th from the second layer 12 when viewed from the direction perpendicular to the main surfaces 11a and 11b of the first layer 11 (Z direction).

For example, as illustrated in FIGS. 4A and 4B, the high-pressure detecting strain gauge 125 is disposed, in the region functioning as the diaphragm 124 of the second layer 12, on the outer side of the stopper portion 131_3 of the third layer 13_3 that is third from the second layer 12 when viewed from the Z direction.

The pressure detecting strain gauge 126_n corresponding to the third layer 13_n that is n-th from the second layer 12 is disposed, in the region functioning as the diaphragm 124 of the second layer 12, on the inner side of the high-pressure detecting strain gauge 125 and on the outer side of the stopper portion 131_(n−1) of the third layer 13_(n−1) that is (n−1)-th from the second layer 12 when viewed from the Z direction.

For example, as illustrated in FIGS. 4A and 4B, the pressure detecting strain gauge 126_3 corresponding to the third layer 13_3 that is third from the second layer 12 is disposed, in the region functioning as the diaphragm 124 of the second layer 12, on the inner side of the high-pressure detecting strain gauge 125 and on the outer side of the stopper portion 131_2 of the third layer 13_2 that is second from the second layer 12 when viewed from the Z direction.

A pressure detecting strain gauge 126_j corresponding to a third layer 13_j that is j-th (1<j<n) from the second layer 12 is disposed, in the region functioning as the diaphragm 124 of the second layer 12, on the inner side of a pressure detecting strain gauge 126_(j+1) of a third layer 13_(j+1) that is (j+1)-th from the second layer 12 and on the outer side of a stopper portion 131_(j−1) of a third layer 13_(j−1) that is (j−1)-th from the second layer 12 when viewed from the Z direction.

For example, as illustrated in FIGS. 4A and 4B, the pressure detecting strain gauge 126_2 corresponding to the third layer 13_2 that is second from the second layer 12 is disposed, in the region functioning as the diaphragm 124 of the second layer 12, on the inner side of the pressure detecting strain gauge 126_3 corresponding to the third layer 13_3 that is third from the second layer 12 and on the outer side of the stopper portion 131_1 of the third layer 13_1 when viewed from the Z direction.

The pressure detecting strain gauge 126_1 corresponding to the third layer 13_1 that is first from the second layer 12 is disposed, in the region functioning as the diaphragm 124 of the second layer 12, on the inner side of the pressure detecting strain gauge 126_2 corresponding to the third layer 13_2 that is second from the second layer 12 when viewed from the Z direction.

2. Operation of Pressure Sensor Chip 1A

The pressure sensor chip 1A having the above-described structure operates in the following manner.

For example, if a pressure higher than a pressure in the chamber 132 of the pressure sensor chip 1A is introduced from the pressure introduction channel 111, the diaphragm 124 is displaced in the +Z direction (toward the third layer 13_1). During a period until the diaphragm 124 is displaced and lands on the stopper portion 131_1 of the third layer 13_1, stress produced in the diaphragm 124 is applied to the resistors R21_1 to R24_1 constituting the pressure detecting bridge circuit B10_1, and accordingly the resistance values of the resistors R21_1 to R24_1 are changed. The change in the resistance values is output as electric signals from the terminals Pb_1 and Pd_1 of the pressure detecting bridge circuit B10_1, and thereby a pressure on a lower pressure side can be measured.

If the pressure applied from the pressure introduction channel 111 to the diaphragm 124 increases, the amount of displacement in the +Z direction of the diaphragm 124 increases in accordance with the pressure, and the diaphragm 124 lands on the stopper portion 131_1. Accordingly, displacement of the diaphragm 124 is limited and breakdown of the diaphragm 124 is prevented.

If the pressure applied to the diaphragm 124 further increases after the diaphragm 124 lands, the pressure applied to the third layer 13_1 through the diaphragm 124. Accordingly, the third layer 13_1 is displaced in the +Z direction. The displacement of the third layer 13_1 produces stress in a region where the diaphragm 124 is bonded to the third layer 13_1. The stress is applied to the resistors R21_2 to R24_2 constituting the pressure detecting bridge circuit B10_2, and accordingly the resistance values of the resistors R21_2 to R24_2 are changed. The change in the resistance values is output as electric signals from the terminals Pb_2 and Pd_2 of the pressure detecting bridge circuit B10_2, and thereby a pressure on a higher pressure side can be detected.

If the pressure applied to the diaphragm 124 increases and if the third layer 13_1 lands on the stopper portion 131_2 of the third layer 13_2 located thereabove, the pressure is applied to the third layer 2 through the diaphragm 124 and the third layer 13_1. Accordingly, the third layer 13_2 is displaced in the +Z direction, and stress is produced in a region where the diaphragm 124 is bonded to the third layer 13_1. The stress is applied to the resistors R21_3 to R24_3 constituting the pressure detecting strain gauge 126_3, and accordingly the resistance values of the resistors R21_3 to R24_3 are changed. The change in the resistance values is output as electric signals from the terminals Pb_3 and Pd_3 of the pressure detecting bridge circuit B10_3, and thereby a pressure on a still higher pressure side can be detected.

If the pressure applied to the diaphragm 124 further increases and if the third layer 13_2 lands on the stopper portion 131_3 of the third layer 13_3 located thereabove, the pressure is applied to the third layer 13_3 through the diaphragm 124, the third layer 13_1, and the third layer 13_2. Accordingly, the third layer 13_3 is displaced in the direction, and stress is produced in a region where the diaphragm 124 is bonded to the third layer 13_1. The stress is applied to the resistors R11 to R14 constituting the high-pressure detecting strain gauge 125, and accordingly the resistance values of the resistors R11 to R14 are changed. The change in the resistance values is output as electric signals from the terminals Pf and Ph of the high-pressure detecting bridge circuit B20, and thereby a pressure on a yet higher pressure side can be detected.

3. Method for Manufacturing Pressure Sensor Chip 1A

Next, a description will be given of a method for manufacturing the pressure sensor chip 1A.

FIGS. 6A to 6I are diagrams illustrating a process of fabricating a chip in the method for manufacturing the pressure sensor chip 1A according to the second embodiment. Here, a description will be given of the method for manufacturing the pressure sensor chip 1A in a case where n=3.

Figure 6A:
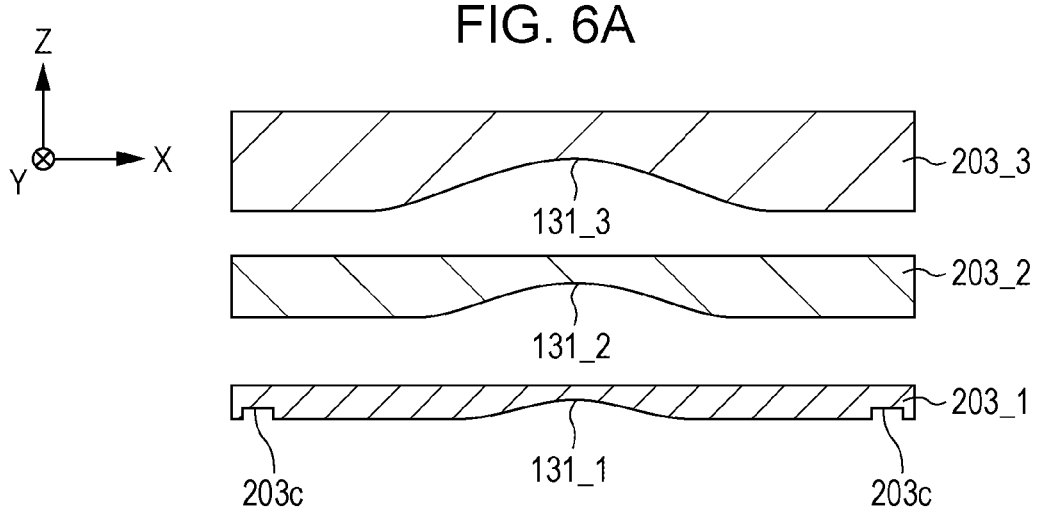
FIG. 6A is a diagram illustrating a process of fabricating a chip in a method for manufacturing the pressure sensor chip according to the second embodiment.

First, as illustrated in FIG. 6A, the stopper portions 131_1 to 131_3 are respectively formed in three substrates 203_1 to 203_3 that are made of silicon, for example (step S01). Specifically, the substrates 203_1 to 203_3 are selectively removed by using a known semiconductor manufacturing technique, for example, well-known photolithography and dry etching using a grayscale mask having different light transmittances (see, for example, Japanese Unexamined Patent Application Publication No. 2005-69736), thereby forming the stopper portions 131_1 to 131_3 having a curved surface at one of two main surfaces facing each other of the substrates 203_1 to 203_3, respectively.

At this time, a plurality of holes 203c are formed at one of the main surfaces of the substrate 203_1, which is a bottom layer, in addition to the stopper portion 131_1. The plurality of holes 203c correspond to the plurality of electrode pads 129 constituting the terminals Pa_1 to Pd_1, Pa_2 to Pd_2, Pa_3 to Pd_3, and Pe to Ph.

Figure 6B:
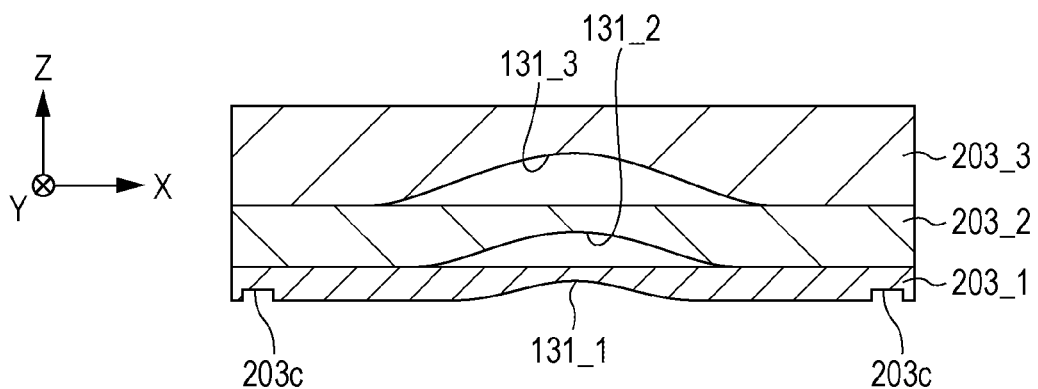
FIG. 6B is a diagram illustrating the process of fabricating the chip in the method for manufacturing the pressure sensor chip according to the second embodiment.

Subsequently, as illustrated in FIG. 6B, the three substrates 203_1 to 203_3 processed in step S01 are bonded to each other (step S02). Specifically, with use of a known substrate bonding technique, the main surface provided with the stopper portion 131_3 of the substrate 203_3 is bonded to the main surface opposite to the main surface provided with the stopper portion 131_2 of the substrate 203_2. Subsequently, with use of the known substrate bonding technique, the main surface provided with the stopper portion 131_2 of the substrate 203_2 is bonded to the main surface opposite to the main surface provided with the stopper portion 131_1 of the substrate 203_1.

Figure 6C:
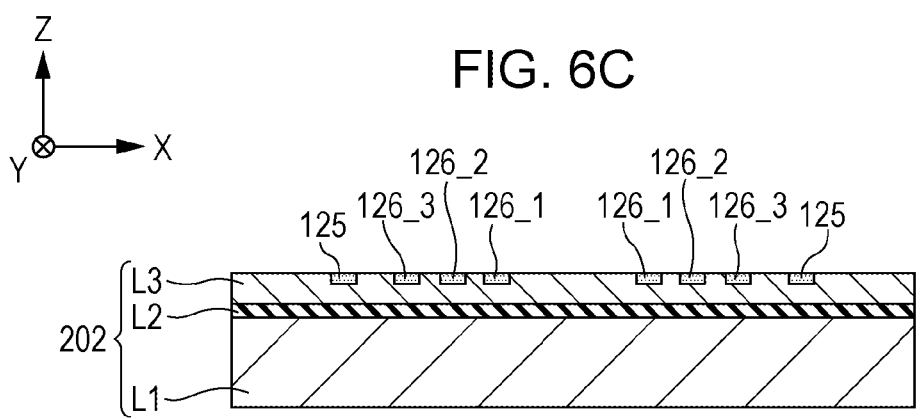
FIG. 6C is a diagram illustrating the process of fabricating the chip in the method for manufacturing the pressure sensor chip according to the second embodiment.

Subsequently, as illustrated in FIG. 6C, the resistors R11 to R14 serving as the high-pressure detecting strain gauge 125 and the resistors R21_1 to R24_1, R21_2 to R24_2, and R21_3 to R24_3 serving as the pressure detecting strain gauges 126_1 to 126_3 are formed in a substrate 202 that is different from the substrates 203_1 to 203_3 (step S03).

The substrate 202 is, for example, an SOI substrate made up of a silicon substrate layer L1, a buried oxide (BOX) layer L2 formed on the silicon substrate layer L1, and a silicon layer L3 (121) formed on the BOX layer L2.

In step S03, for example, the silicon layer L3 of the substrate 202, which is an SOI substrate, is doped with impurity by using a well-known ion implantation technique, thereby forming diffused resistors as the resistors R11 to R14 of the high-pressure detecting strain gauge 125 and diffused resistors as the resistors R21_1 to R24_1, R21_2 to R24_2, and R21_3 to R24_3 of the pressure detecting strain gauges 126_1 to 126_3, and forming a lead wiring pattern for connecting the gauges by using diffused resistors in the same method.

Figure 6D:
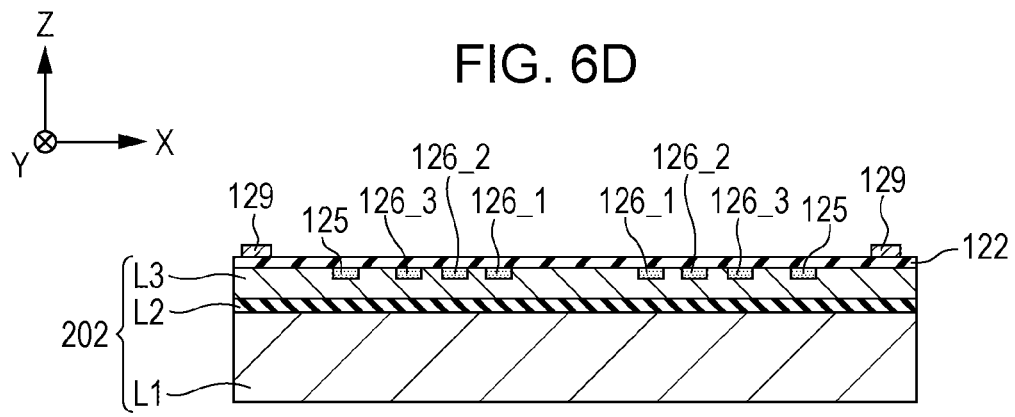
FIG. 6D is a diagram illustrating the process of fabricating the chip in the method for manufacturing the pressure sensor chip according to the second embodiment.

Subsequently, as illustrated in FIG. 6D, a silicon oxide (SiO_2) layer serving as the insulating layer 122 is formed on the active layer 121 of the substrate 202. In addition, metal wiring patterns connected to the individual nodes of the bridge circuits B20 and B10_1 to B10_3 respectively constituted by the resistors R11 to R14, R21_1 to R24_1, R21_2 to R24_2, and R21_3 to R24_3 and the lead wiring pattern, and the plurality of electrode pads 129 serving as the terminals Pe to Ph, Pa to Pd_1, Pa_2 to Pd_2, and Pa_3 to Pd_3 connected to the metal wiring patterns are formed on the insulating layer 122 (step S04).

Figure 6E:
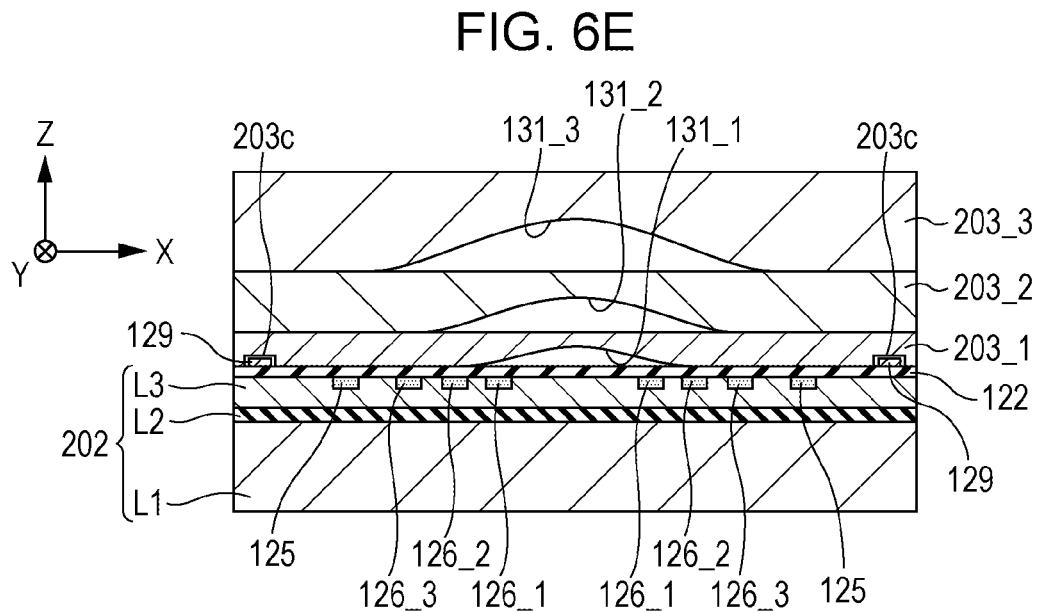
FIG. 6E is a diagram illustrating the process of fabricating the chip in the method for manufacturing the pressure sensor chip according to the second embodiment.

Subsequently, as illustrated in FIG. 6E, the three substrates 203_1 to 203_3 bonded together in step S02 and the substrate 202 processed in step S04 are bonded to each other (step S05). Specifically, the main surface provided with the stopper portion 131_1 of the substrate 203_1 and the insulating layer 122 of the substrate 202 are bonded to each other by using the known substrate bonding technique.

Figure 6F:
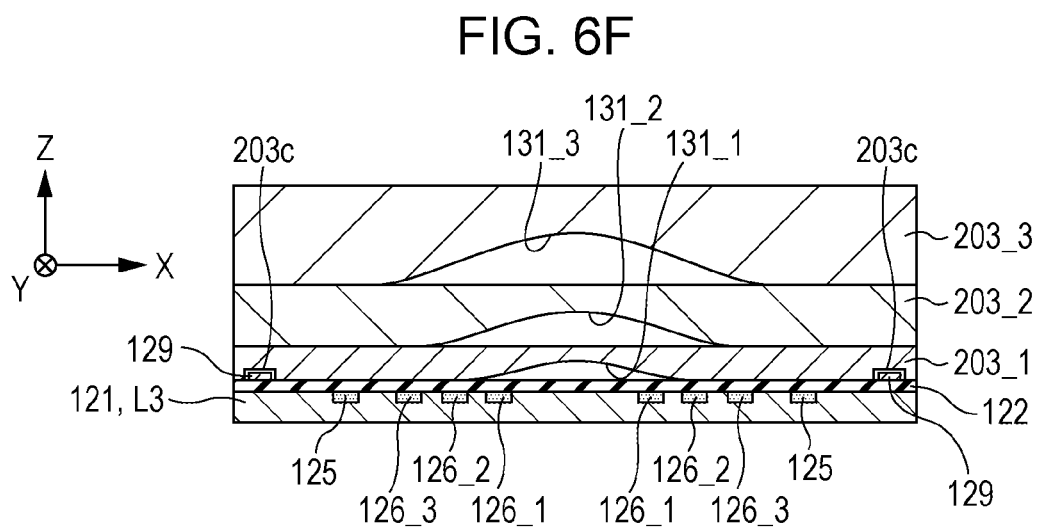
FIG. 6F is a diagram illustrating the process of fabricating the chip in the method for manufacturing the pressure sensor chip according to the second embodiment.

Subsequently, as illustrated in FIG. 6F, the silicon substrate layer L1 and the BOX layer L2 of the substrate 202 in the bonded substrate obtained in step S05 are removed (step S06).

Figure 6G:
FIG. 6G is a diagram illustrating the process of fabricating the chip in the method for manufacturing the pressure sensor chip according to the second embodiment.

In addition, as illustrated in FIG. 6G, the pressure introduction channel 111 is formed in a substrate 201 made of silicon, for example (step S07). Specifically, the substrate 201 is selectively removed by using a known semiconductor manufacturing technique, for example, well-known photolithography and dry etching, thereby forming the first hole 112 and the second hole 113 that extend through the two main surfaces facing each other of the substrate 201 and that serve as the pressure introduction channel 111. At this time, as illustrated in FIG. 6G, the edge 113a of the second hole 113 has an arc shape (semicircular shape) when viewed from a direction parallel to the main surface of the substrate 201 (Y direction). With this structure, stress produced when a pressure is applied can be diffused, and pressure resistance can be increased.

Figure 6H:
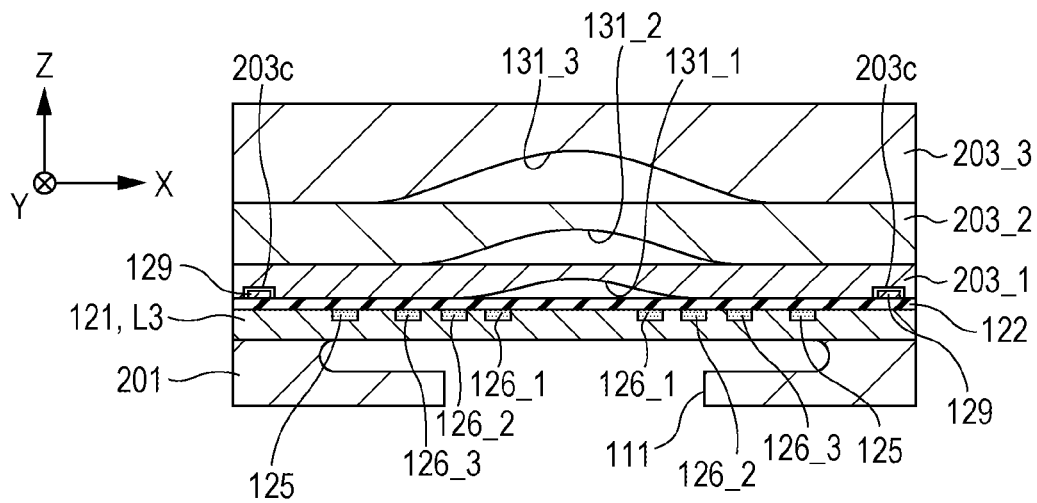
FIG. 6H is a diagram illustrating the process of fabricating the chip in the method for manufacturing the pressure sensor chip according to the second embodiment.

Subsequently, as illustrated in FIG. 6H, the substrate 201 processed in step S07 is bonded to the bonded substrate processed in step S06 (step S08). Specifically, with use of the known substrate bonding technique, the active layer 121 of the substrate 202 and the main surface provided with the second hole 113 of the substrate 201 are bonded to each other such that the pressure introduction channel 111 faces the stopper portion 131 when viewed from the direction in which the substrate 202 is laminated on the substrate 201 (Z direction).

Figure 6I:
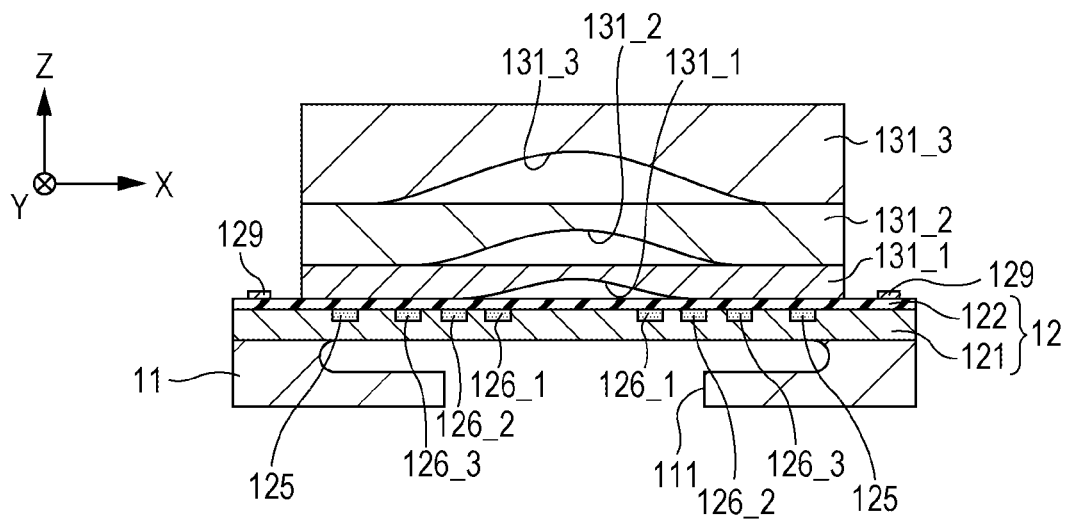
FIG. 6I is a diagram illustrating the process of fabricating the chip in the method for manufacturing the pressure sensor chip according to the second embodiment.

Subsequently, as illustrated in FIG. 6I, the bonded substrate obtained by bonding the substrates 201, 202, and 203 together is diced into a plurality of chips, and an unnecessary portion is removed (step S09).

With this process, a plurality of pressure sensor chips 1A are manufactured.

In the above-described manufacturing method, the first layer 11 is formed by using the substrate 201 different from the substrate 202. Alternatively, the first layer 11 may be formed by using the substrate 202, which is an SOI substrate.

Specifically, the following steps S06a to S08a may be performed instead of steps S06 to S08.

Figure 7A:
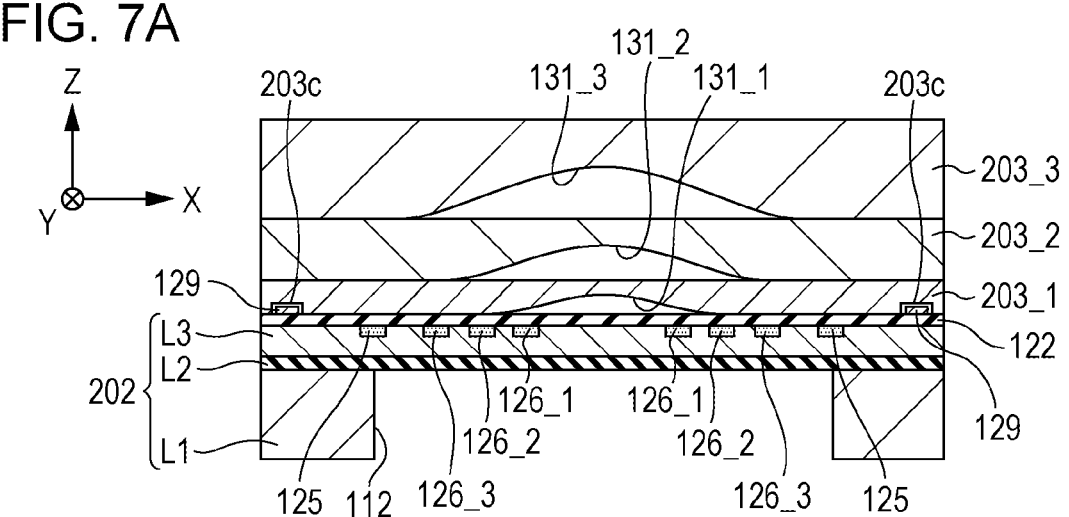
FIG. 7A is a diagram illustrating another process of fabricating a chip in the method for manufacturing the pressure sensor chip according to the second embodiment.

For example, as illustrated in FIG. 7A, the first hole 112 is formed in the silicon substrate layer L1 of the substrate 202 (step S06a) after step S05. Specifically, the silicon substrate layer L1 of the substrate 202 is selectively removed by using well-known photolithography and dry etching, thereby forming the first hole 112.

Figure 7B:
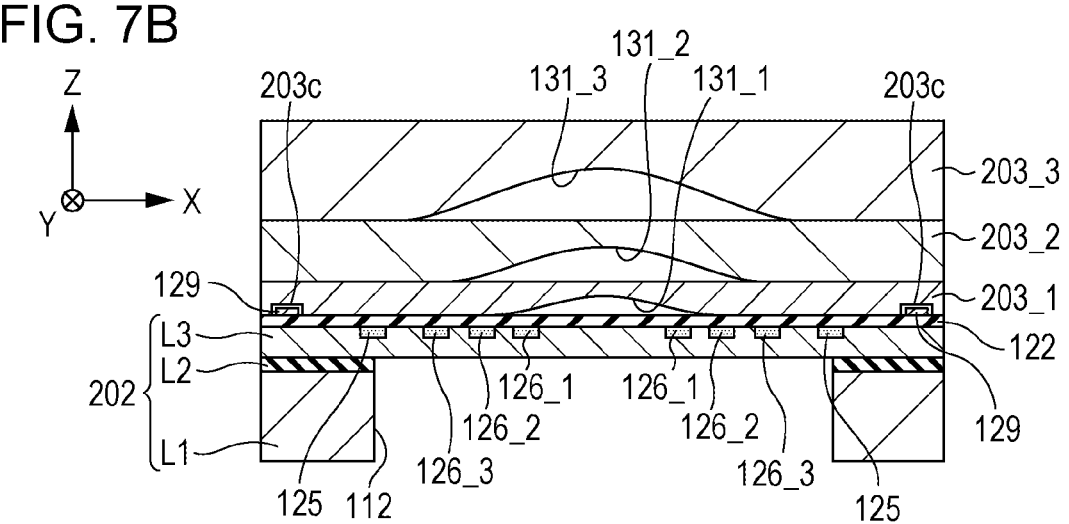
FIG. 7B is a diagram illustrating the other process of fabricating the chip in the method for manufacturing the pressure sensor chip according to the second embodiment.

Subsequently, as illustrated in FIG. 7B, the BOX layer L2 of the substrate 202 is removed (step S07a). Specifically, the BOX layer L2 in the first hole 112 of the substrate 202 is selectively removed by using, for example, well-known photolithography and dry etching.

Figure 7C:
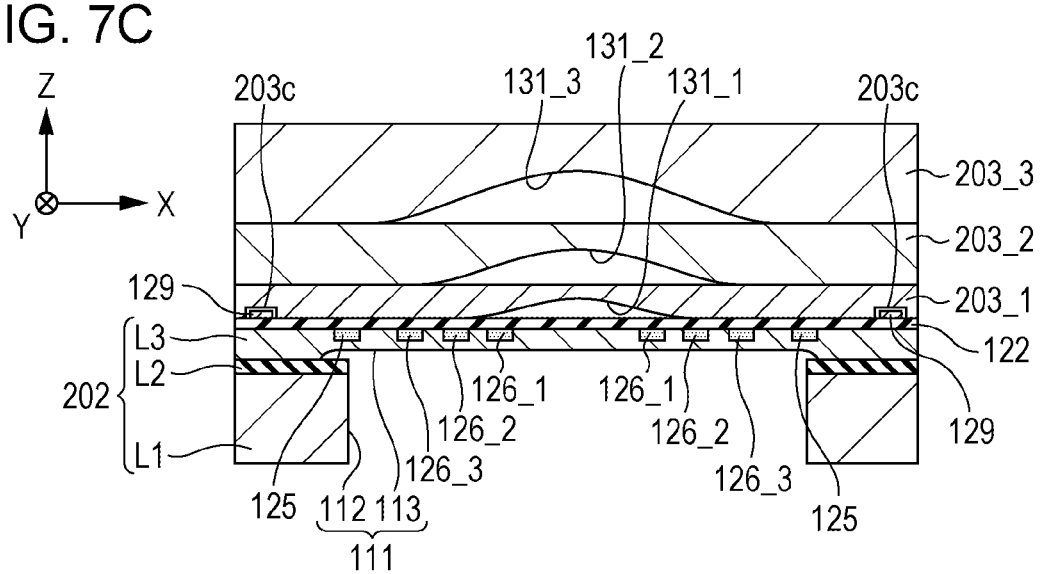
FIG. 7C is a diagram illustrating the other process of fabricating the chip in the method for manufacturing the pressure sensor chip according to the second embodiment.

Subsequently, as illustrated in FIG. 7C, the second hole 113 is formed in the active layer 121 (L3) of the substrate 202 (step S08a). Specifically, the second hole 113 is formed by selectively removing the active layer 121 of the substrate 202 by using, for example, well-known photolithography and etching (for example, wet etching).

With the above-described process, a bonded substrate including the first layer 11, the second layer 12, and the third layer 13 can be formed as in the above-described steps S06 to S08.

4. Effect of Pressure Sensor Chip 1A

As described above, the pressure sensor chip 1A according to the second embodiment has a structure in which the opening areas of the stopper portions 131_1 to 131_n in the third layers 13_1 to 13_n laminated on the single diaphragm 124 increase as the distance from the diaphragm 124 increases, and the resistors of the pressure detecting strain gauges corresponding to the respective third layers 13_1 to 13_n are concentrically located in the diaphragm 124 so as to be separated from each other. Accordingly, a multi-range pressure sensor having a wider measurement range than that of the pressure sensor chip 1 according to the first embodiment can be commercialized.

Third Embodiment

Figure 8A:
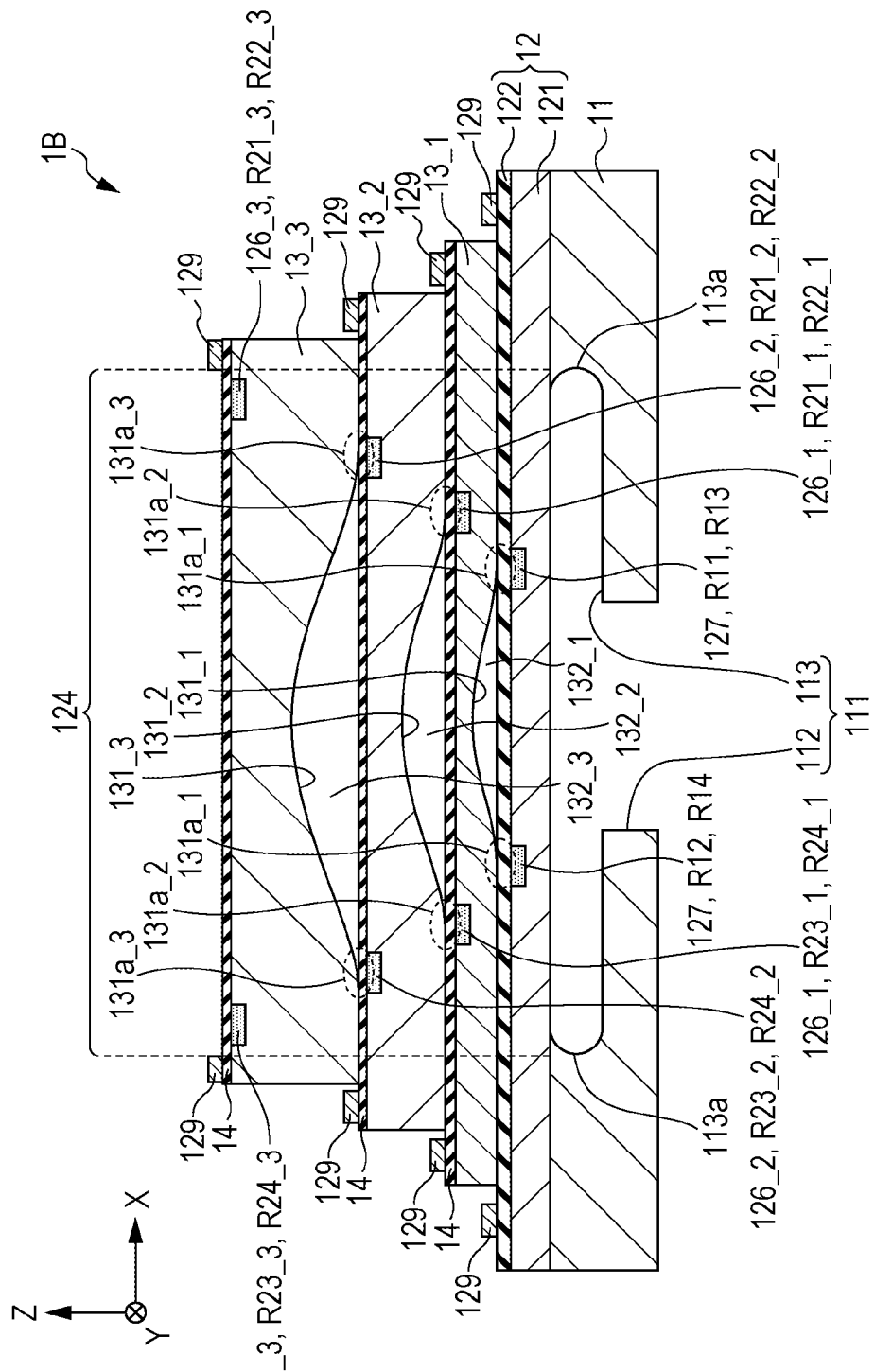
FIG. 8A is a diagram schematically illustrating the cross-sectional shape of a pressure sensor chip according to a third embodiment of the present disclosure.
Figure 8B:
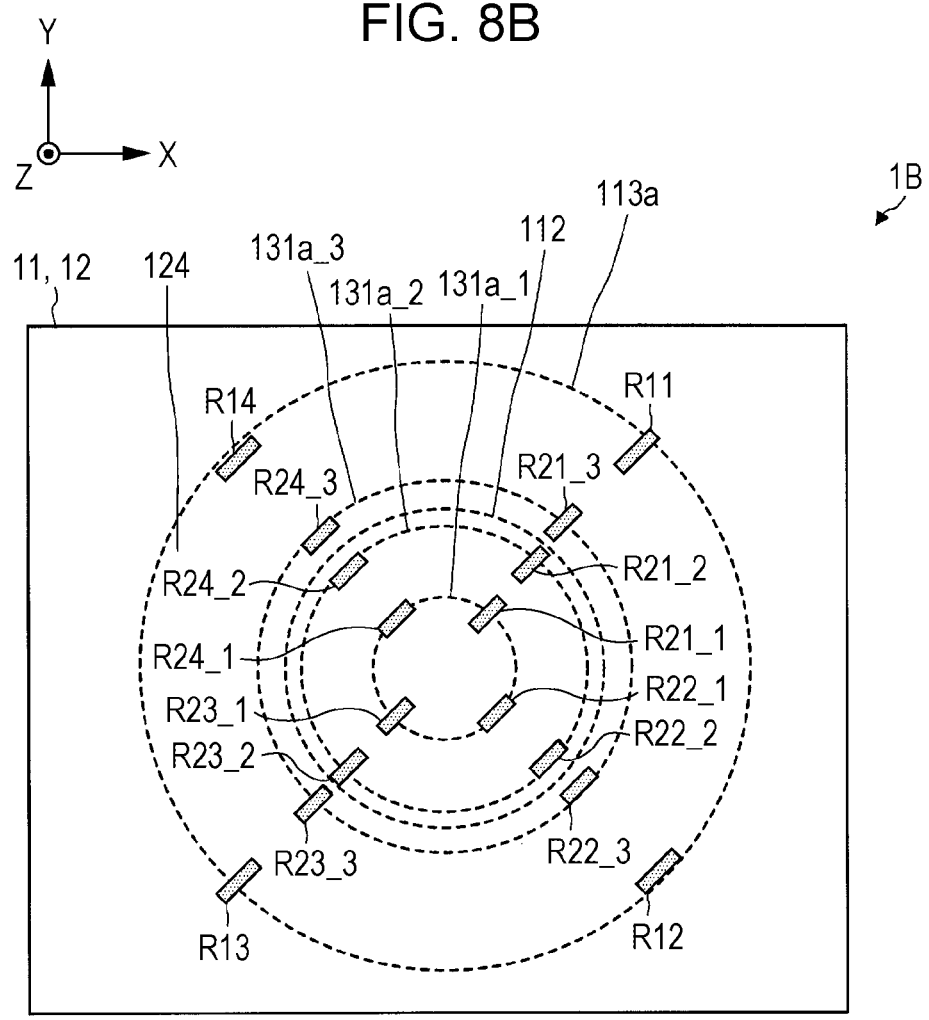
FIG. 8B is a diagram schematically illustrating the plane shape of the pressure sensor chip according to the third embodiment of the present disclosure.

FIGS. 8A and 8B are diagrams illustrating the configuration of a pressure sensor chip 1B according to a third embodiment of the present disclosure. FIG. 8A schematically illustrates the cross-sectional shape of the pressure sensor chip 1B according to the third embodiment, and FIG. 8B schematically illustrates the plane shape of the pressure sensor chip 1B according to the third embodiment. In FIG. 8B, some elements are not illustrated so that the arrangement of resistors constituting each strain gauge can be clearly seen.

The pressure sensor chip 1B illustrated in FIGS. 8A and 8B is different from the pressure sensor chip 1A according to the second embodiment in that the pressure detecting strain gauges corresponding to the third layers 13_1 to 13_n including the stopper portions 131_1 to 131_n are disposed in the respective third layers 13_1 to 13_n, not in the second layer 12 functioning as the diaphragm 124. In the other points, the pressure sensor chip 1B is the same as the pressure sensor chip 1A according to the second embodiment.

Among the elements of the pressure sensor chip 1B according to the third embodiment, the same elements as those of the pressure sensor chip 1A according to the second embodiment are denoted by the same reference numerals, and the detailed description thereof will not be given.

1. Configuration of Pressure Sensor Chip 1B

In the pressure sensor chip 1B, the third layers 13_1 to 13_n are laminated one on top of another with an insulating layer (for example, a silicon oxide film) 14 interposed therebetween. In the third layers 13_1 to 13_n, the pressure detecting strain gauges 126_1 to 126_n are disposed, respectively.

Specifically, the pressure detecting strain gauge 126_n is disposed, in the third layer 13_n that is n-th from the second layer 12, on the outer side of the stopper portion 131_n of the third layer 13_n when viewed from the Z direction. For example, when n=3, the pressure detecting strain gauge 126_3 is disposed on the outer side of the stopper portion 131_3 of the third layer 13_3 when viewed from the Z direction, as illustrated in FIGS. 8A and 8B.

The pressure detecting strain gauge 126_j (1≤j<n) is disposed, in the third layer 13_j that is j-th from the second layer 12, on the outer side of the stopper portion 131_j of the third layer 13_j and on the inner side of the pressure detecting strain gauge 126_(j+1) of the third layer 131_(j+1) that is (j+1)-th from the second layer 12, when viewed from the Z direction.

For example, the pressure detecting strain gauge 126_2 is disposed, in the third layer 13_2 that is second from the second layer 12, on the outer side of the stopper portion 131_2 of the third layer 13_2 and on the inner side of the pressure detecting strain gauge 126_3 of the third layer 13_3 that is third from the second layer 12, when viewed from the Z direction. The pressure detecting strain gauge 126_1 is disposed, in the third layer 13_1 that is first from the second layer 12, on the outer side of the stopper portion 131_1 of the third layer 13_1 and on the inner side of the pressure detecting strain gauge 126_2 of the third layer 13_2 that is second from the second layer 12, when viewed from the Z direction.

The nodes of the bridge circuits made up of the resistors constituting the pressure detecting strain gauges 126_1 to 126_3 are respectively connected to the electrode pads serving as the terminals Pa_1 to Pd_1, Pa_2 to Pd_2, and Pa_3 to Pd_3 disposed on the insulating layer 122, as in the pressure sensor chip 1A according to the second embodiment. For example, the nodes are connected to the electrode pads 129 disposed on the individual insulating layers 14 through wiring lines made up of diffused resistors disposed in the individual third layers 13_1 to 13_3.

On the other hand, a pressure detecting strain gauge 127 serving as a first strain gauge is disposed on the inner side of the pressure detecting strain gauge 126_1 of the third layer 13_1 when viewed from the Z direction. The resistors R11 to R14 constituting the pressure detecting strain gauge 127 constitute a bridge circuit that is similar to the above-described high-pressure detecting strain gauge 125.

In the pressure sensor chip 1B having the above-described structure, if a pressure is applied from the pressure introduction channel 111 to the diaphragm 124, the pressure detecting strain gauge 127 detects the pressure until the diaphragm 124 lands on the stopper portion 131 of the third layer 13_1. After the diaphragm 124 lands on the stopper portion 131_1 of the third layer 13_1 and until the third layer 13_1 lands on the stopper 131_2 of the third layer 13_2, the pressure detecting strain gauge 126_1 disposed in the third layer 13_1 detects the pressure. If the pressure applied from the pressure introduction channel 111 to the diaphragm 124 further increases, after the third layer 13_1 lands on the stopper portion 131_2 of the third layer 13_2 and until the third layer 13_2 lands on the stopper portion 131_3 of the third layer 13_3, the pressure detecting strain gauge 126_2 disposed in the third layer 13_2 detects the pressure. Furthermore, if the third layer 13_3 is displaced after the third layer 13_2 lands on the stopper portion 131_3 of the third layer 13_3, the pressure detecting strain gauge 126_3 disposed in the stopper portion 131_3 of the third layer 13_3 detects the pressure.

2. Effect of Pressure Sensor Chip 1B

With the pressure sensor ship 1B according to the third embodiment, like the pressure sensor chip 1A according to the second embodiment, a multi-range pressure sensor having a wider measurement range can be commercialized.

Fourth Embodiment

Figure 9A:
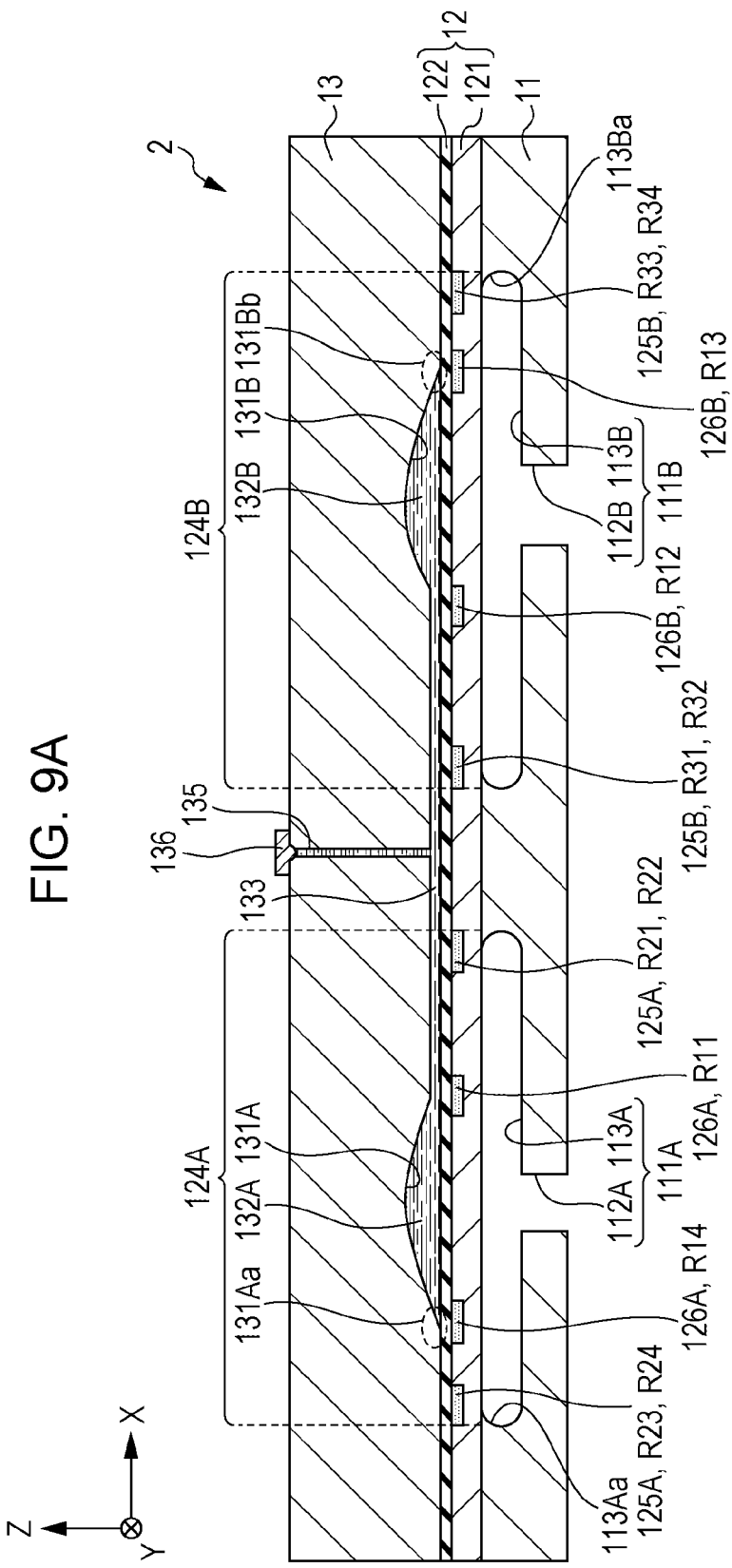
FIG. 9A is a diagram schematically illustrating the cross-sectional shape of a pressure sensor chip according to a fourth embodiment of the present disclosure.
Figure 9B:
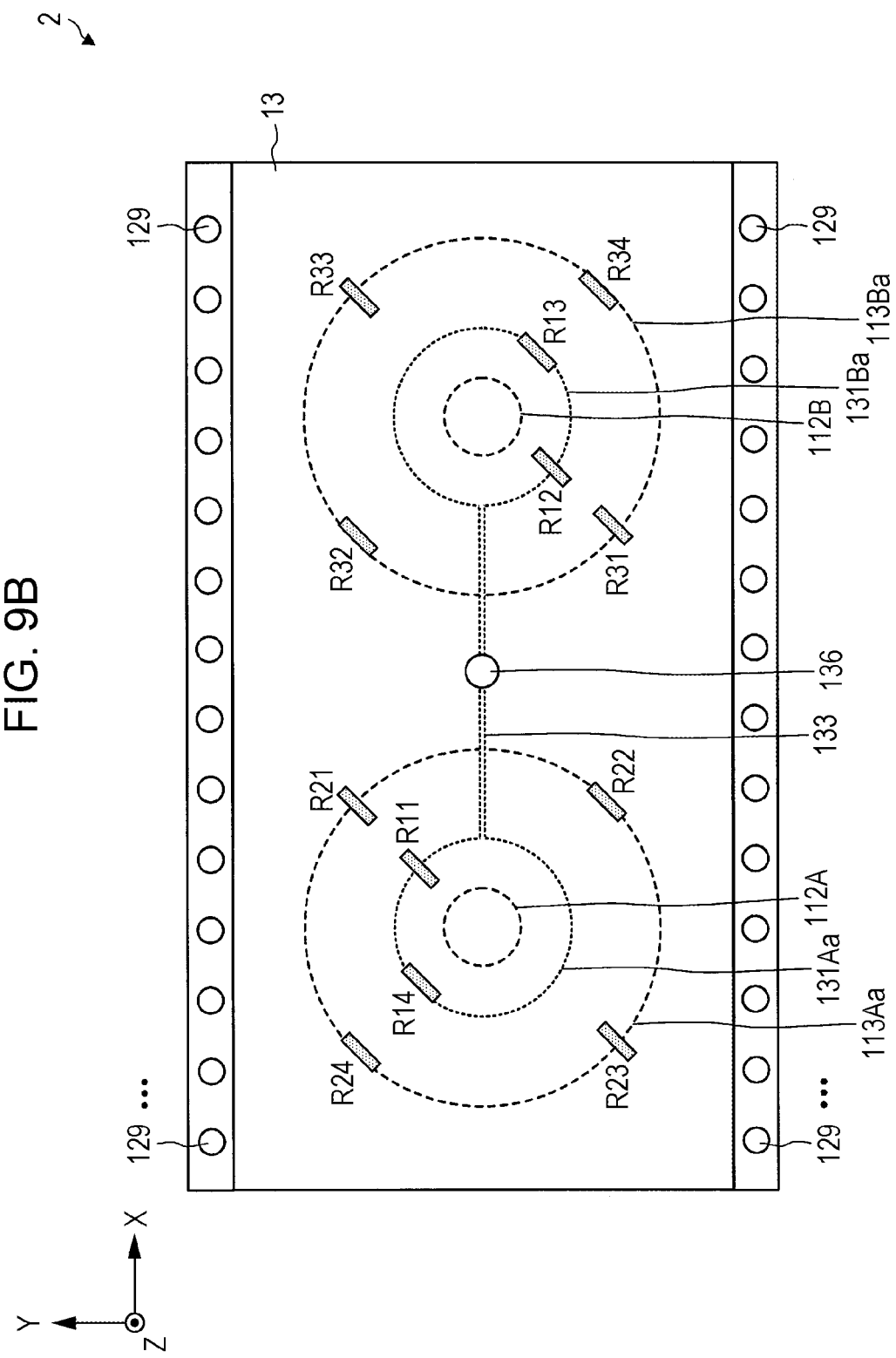
FIG. 9B is a diagram schematically illustrating the plane shape of the pressure sensor chip according to the fourth embodiment of the present disclosure.

FIGS. 9A and 9B are diagrams illustrating the configuration of a pressure sensor chip 2 according to a fourth embodiment of the present disclosure. FIG. 9A schematically illustrates the cross-sectional shape of the pressure sensor chip 2 according to the fourth embodiment, and FIG. 9B schematically illustrates the plane shape of the pressure sensor chip 2 according to the fourth embodiment.

The pressure sensor chip 2 illustrated in FIGS. 9A and 9B is a differential pressure/static pressure sensor chip capable of measuring a low differential pressure and a high differential pressure.

The pressure sensor chip 2 is a parallel-diaphragm-type differential pressure sensor chip having a structure in which a low-pressure detecting diaphragm and a high-pressure detecting diaphragm, each including a low-pressure detecting strain gauge and a high-pressure detecting strain gauge, are arranged in a plane direction and in which two chambers just above the respective diaphragms spatially communicate with each other through a communication channel.

The same elements as those of the pressure sensor chip 1 according to the first embodiment are denoted by the same reference numerals, and the detailed description thereof will not be given.

1. Pressure Sensor Chip 2

Specifically, the pressure sensor chip 2 has a structure in which the first layer 11 for introducing a pressure, the second layer 12 functioning as a diaphragm, and the third layer 13 for limiting deformation of the diaphragm in one direction are laminated one on top of another.

In the first layer 11, two pressure introduction channels 111, each being the same as the pressure introduction channel of the pressure sensor chip 1, are disposed. One of the pressure introduction channels 111 is referred to as a "pressure introduction channel 111A" for detecting a high pressure, and the other pressure introduction channel 111 is referred to as a "pressure introduction channel 111B" for detecting a low pressure. The holes constituting the pressure introduction channel 111A are referred to as a "first hole 112A" and a "second hole 113A", and the holes constituting the pressure introduction channel 111B are referred to as a "first hole 112B" and a "second hole 113B".

The second layer 12 is disposed on the main surface 11b of the first layer 11 so as to cover at least the pressure introduction channels 111A and 111B. In the second layer 12, a region that covers the pressure introduction channel 111A (the second hole 113A) functions as a diaphragm 124A, and a region that covers the pressure introduction channel 111B (the second hole 113B) functions as a diaphragm 124B.

As in the pressure sensor chip 1, the second layer 12 is made up of the active layer 121 disposed on the main surface 11b of the first layer 11 and the insulating layer (for example, a silicon oxide ($SiO_2$) layer) 122 disposed on the active layer 121. In the active layer 121, a region functioning as the diaphragm 124A is provided with a low-pressure detecting strain gauge 126A and a high-pressure detecting strain gauge 125A serving as pressure-sensitive elements for detecting a pressure applied to the diaphragm 124A. In the active layer 121, a region functioning as the diaphragm 124B is provided with a low-pressure detecting strain gauge 126B and a high-pressure detecting strain gauge 125B serving as pressure-sensitive elements for detecting a pressure applied to the diaphragm 124B.

The details of the low-pressure detecting strain gauges 126A and 126B and the high-pressure detecting strain gauges 125A and 125B will be described below.

The third layer 13 includes the main surface 13a, which is bonded onto the insulating layer 122 of the second layer 12. At the main surface 13a of the third layer 13, two stopper portions 131, each having the same structure as the stopper portion of the pressure sensor chip 1, are disposed. Among the two stopper portions 131, the stopper portion 131 that faces the pressure introduction channel 111A with the diaphragm 124A interposed therebetween is referred to as a "stopper portion 131A", and the stopper portion 131 that faces the pressure introduction channel 111B with the diaphragm 124B interposed therebetween is referred to as a "stopper portion 131B". The space between the stopper portion 131A and the diaphragm 124A is referred to as a "chamber 132A", and the space between the stopper portion 131B and the diaphragm 124B is referred to as a "chamber 12B".

In the third layer 13, a communication channel 133 that allows the chamber 132A and the chamber 132B to communicate with each other is disposed. In other words, the chamber 132A and the chamber 132B are spatially connected to each other through the communication channel 133.

The communication channel 133 is made up of a groove disposed between the stopper portion 131A and the stopper portion 131B at the main surface 13a of the third layer 13 and one main surface of the second layer 12 that covers the groove.

The chambers 132A and 132B and the communication channel 133 are filled with a pressure transmission material 15. The pressure transmission material 15 is a material for transmitting a pressure applied to one of the diaphragms 124A and 124B to the other of the diaphragms 124A and 124B through the communication channel 133. Examples of the pressure transmission material 15 include silicone oil and fluorine oil.

Specifically, as illustrated in FIG. 9A, a communication channel 135 is formed, which opens on one main surface of the third layer 13 and which communicates with the communication channel 133. The pressure transmission material (oil) 15 is introduced from the communication channel 135, and the communication channel 135 is sealed by a sealing member 136. Accordingly, the chambers 132A and 132B and the communication channel 133 can be filled with the pressure transmission material 15.

Now, a detailed description will be given of the low-pressure detecting strain gauges 126A and 126B and the high-pressure detecting strain gauges 125A and 125B.

The high-pressure detecting strain gauge 125A is disposed, in the region functioning as the diaphragm 124A of the second layer 12, on the outer side of the stopper portion 131A when viewed from the Z direction. For example, the high-pressure detecting strain gauge 125A is disposed, in the region functioning as the diaphragm 124A of the second layer 12, at a peripheral portion of the pressure introduction channel 111A, that is, at an edge 113Aa of the second hole 113A, when viewed from the Z direction.

The high-pressure detecting strain gauge 125B is disposed, in the region functioning as the diaphragm 124B of the second layer 12, on the outer side of the stopper portion 131B when viewed from the Z direction. For example, the high-pressure detecting strain gauge 125B is disposed, in the region functioning as the diaphragm 124B of the second layer 12, at a peripheral portion of the pressure introduction channel 111B, that is, at an edge 113Ba of the second hole 113B, when viewed from the Z direction.

On the other hand, the low-pressure detecting strain gauge 126A is disposed, in the region functioning as the diaphragm 124A of the second layer 12, on the inner side of the high-pressure detecting strain gauge 125A when viewed from the Z direction. For example, the low-pressure detecting strain gauge 126A is disposed, in the region functioning as the diaphragm 124A of the second layer 12, at a peripheral portion of the stopper portion 131A, that is, at an edge 131Aa, when viewed from the Z direction.

The low-pressure detecting strain gauge 126B is disposed, in the region functioning as the diaphragm 124B of the second layer 12, on the inner side of the high-pressure detecting strain gauge 125B when viewed from the Z direction. For example, the low-pressure detecting strain gauge 126B is disposed, in the region functioning as the diaphragm 124B of the second layer 12, at a peripheral portion of the stopper portion 131B, that is, at an edge 131Ba, when viewed from the Z direction.

As illustrated in FIGS. 9A and 9B, the low-pressure detecting strain gauge 126A includes the resistors R11 and R14, whereas the low-pressure detecting strain gauge 126B includes the resistors R12 and R13. The high-pressure detecting strain gauge 125A includes the resistors R21 to R24, whereas the high-pressure detecting strain gauge 125B includes resistors R31 to R34. The resistors R11 to R14, R21 to R24, and R31 to R34 are, for example, diffused resistors disposed on the insulating layer 122 side in the active layer 121.

Figure 10:
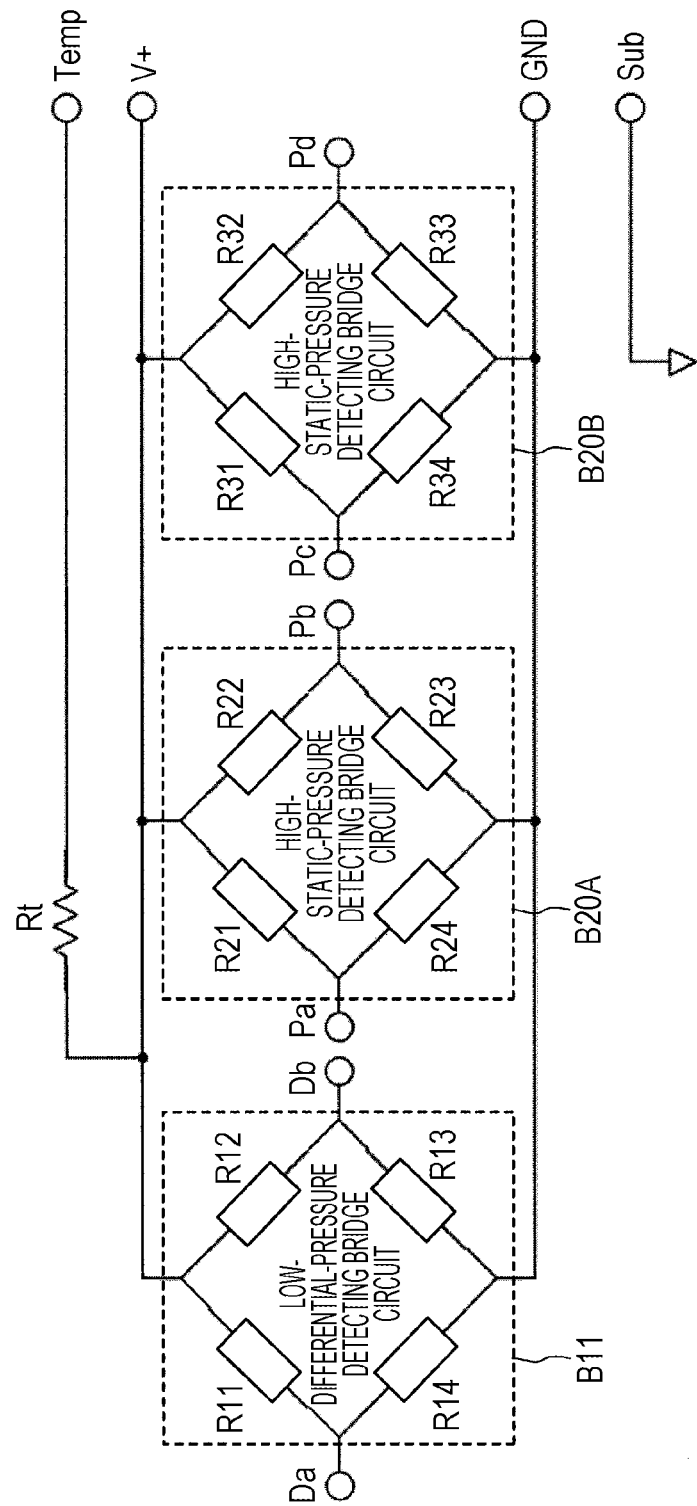
FIG. 10 is a diagram illustrating the configuration of bridge circuits of the pressure sensor chip according to the fourth embodiment.

As illustrated in FIG. 10, the resistors R11 to R14, R21 to R24, and R31 to R34 constitute a low-differential-pressure detecting bridge circuit B11, a high-static-pressure detecting bridge circuit B20A, and a high-static-pressure detecting bridge circuit B20B, respectively. The individual nodes of the low-differential-pressure detecting bridge circuit B11, the high-static-pressure detecting bridge circuit B20A, and the high-static-pressure detecting bridge circuit B20B are respectively connected to the electrode pads 129 disposed on the insulating layer 122 through wiring patterns (not illustrated). The electrode pads 129 respectively constitute the terminals Pa, Pb, Pc, Pd, Da, Db, V+, GND, Sub, Temp, and so forth of the bridge circuits B11, B20A, and B20B illustrated in FIG. 10. In FIG. 10, a resistor Rt is an element for detecting temperature, and the terminal Sub is a terminal for fixing a substrate potential of the second layer 12.

2. Operation of Pressure Sensor Chip 2

The pressure sensor chip 2 having the above-described structure operates in the following manner.

For example, it is assumed that, in a state where a constant current flows between the terminal V+ of the bridge circuits B11, B20A, and B20B and the terminal GND, a pressure is applied from a fluid as a target to be measured to the diaphragms 124A and 124B.

In this case, the chambers 132A and 132B, which respectively face the pressure introduction channels 111A and 111B with the diaphragms 124A and 124B interposed therebetween, communicate with each other through the communication channel 133 and are filled with the oil 15. Thus, a pressure corresponding to a chance in the volume of the oil 15 caused by displacement of one of the diaphragms 124A and 124B is applied to the other of the diaphragms 124A and 124B through the communication channel 133.

At this time, for example, if the pressure applied from the pressure introduction channel 111A to the diaphragm 124A is higher than the pressure applied from the pressure introduction channel 111B to the diaphragm 124B, the diaphragm 124B is displaced by an amount corresponding to the difference between the two pressures in the −Z direction in FIG. 9A (toward the pressure introduction channel 111B). On the other hand, the diaphragm 124A is displaced by an amount corresponding to the difference between the two pressures in the +Z direction in FIG. 9A (toward the stopper 131A).

The displacement of the diaphragms 124A and 124B produces stress in the diaphragms 124A and 124B, and the stress is applied to the strain gauges 125A, 125B, 126A, and 126B. Accordingly, electric signals corresponding to the pressures applied to the diaphragms 124A and 124B are output from the terminals Pa to Pd, Da, and Db of the bridge circuits B11, B20A, and B20B.

For example, from when pressures are applied from the pressure introduction channels 111A and 111B to the diaphragms 124A and 124B to when the diaphragms 124A and 124B land on the stopper portions 131A and 131B, a difference between the pressure applied to the diaphragm 124A and the pressure of a fluid as a target to be measured applied to the diaphragm 124B (low differential pressure) can be measured by detecting, from the terminals Da and Db, a change in the resistance values of the resistors R11 to R14 caused by stress produced in the diaphragms 124A and 124B as a change in voltage.

If a higher pressure is further applied to the diaphragm 124A after the diaphragm 124A lands on the stopper portion 131A, the third layer 13 is deformed in the +Z direction. The high pressure (high static pressure) applied to the diaphragm 124A can be measured by detecting, from the terminals Pa and Pb, a change in the resistance values of the resistors R21 to R24 caused by stress produced in the diaphragm 124A in accordance with the deformation of the third layer 13 as a change in voltage.

Likewise, if a higher pressure is further applied to the diaphragm 124B after the diaphragm 124B lands on the stopper portion 131B, the third layer 13 is deformed in the direction. The high pressure (high static pressure) applied to the diaphragm 124B can be measured by detecting, from the terminals Pc and Pd, a change in the resistance values of the resistors R31 to R34 caused by stress produced in the diaphragm 124B in accordance with the deformation of the third layer 13 as a change in voltage.

Furthermore, in a state where either of the diaphragms 124A and 124B lands on the stopper portion 131A or 131B, a difference (high differential pressure) between the high pressure (high static pressure) applied to the diaphragm 124A and the high pressure (high static pressure) applied to the diaphragm 124B can be measured by using electric signals that are detected from the terminals Pa and Pb and that are based on a change in the resistance values of the resistors R21 to R24 and electric signals that are detected from the terminals Pc and Pd and that are based on a change in the resistance values of the resistors R31 to R34.

3. Effect of Pressure Sensor Chip 2

As described above, the pressure sensor chip 2 according to the fourth embodiment is a parallel-diaphragm-type differential pressure sensor chip and has a structure in which the low-pressure detecting strain gauges 126A and 126B are respectively disposed in the two diaphragms provided between two pressure introduction channels and two stopper portions and in which the high-pressure detecting strain gauges 125A and 125B are disposed on the outer side of the low-pressure detecting strain gauges 126A and 126B.

Accordingly, until the individual diaphragms land on the respective stopper portions, the pressure sensor chip 2 is capable of measuring a difference between two pressures applied from the individual pressure introduction channels by detecting the pressures by using the low-pressure detecting strain gauges 126A and 126B on the inner side in the diaphragms. After either one of the diaphragms lands on the stopper portion, the pressure (high static pressure) applied to the pressure introduction channel that faces the diaphragm can be measured by detecting the pressure by using the high-pressure detecting strain gauge 125A or 125B on the outer side in the diaphragm. At this time, a high differential pressure can be measured on the basis of the difference between the pressures (high static pressures) detected by the high-pressure detecting strain gauges 125A and 125B.

Thus, with the pressure sensor chip 2 according to the fourth embodiment, a one-chip multi-range sensor having multiple measurement ranges for a differential pressure can be commercialized.

In the pressure sensor chip 2, the low-pressure detecting strain gauges 126A and 126B are separately disposed in the respective diaphragms, not in the same diaphragm. This structure enables a measurement error of pressure to be suppressed, the error being based on stress that is produced in the low-pressure detecting strain gauges 126A and 126B in accordance with displacement of the diaphragms caused by expansion and contraction of oil as a pressure transmission material introduced into the chambers 132A and 132B and the communication channel 133.

Fifth Embodiment

Next, a description will be given of an example of a pressure transmitter to which the above-described pressure sensor chip according to the present disclosure is applied.

Figure 11:
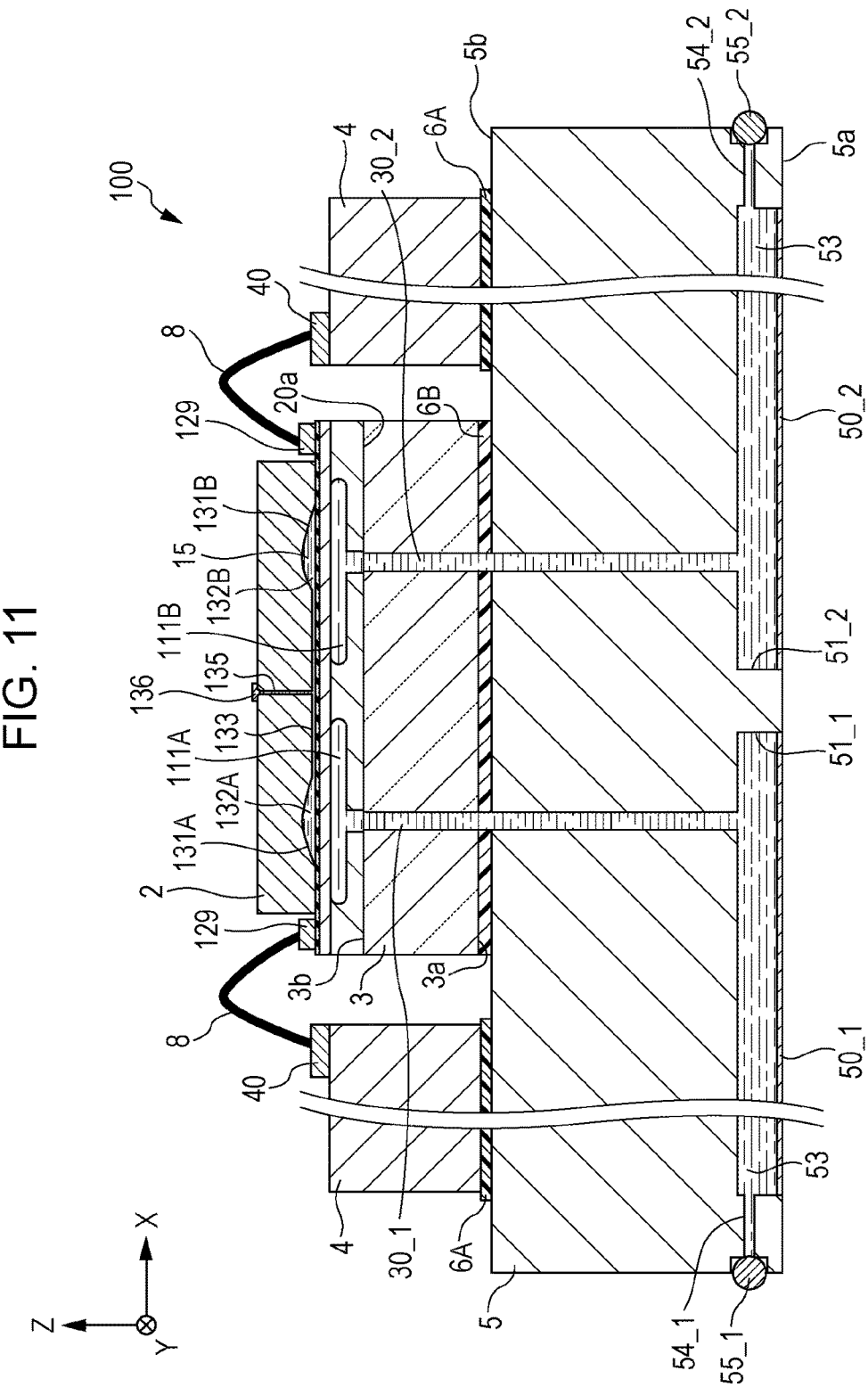
FIG. 11 is a diagram illustrating the structure of a pressure transmitter including the pressure sensor chip according to the fourth embodiment.

FIG. 11 is a diagram illustrating the structure of a pressure transmitter 100 including the pressure sensor chip 2 according to the fourth embodiment.

The pressure transmitter 100 illustrated in FIG. 11 is a differential-pressure transmitter including the parallel-diaphragm-type sensor chip according to the fourth embodiment.

The pressure transmitter 100 includes, as main functional portions for detecting a differential pressure of a fluid as a target to be measured, the pressure sensor chip 2 according to the fourth embodiment, a supporting substrate 3, a diaphragm base 5, and a relay substrate 4. Hereinafter, these functional portions will be described in detail.

In this embodiment, a detailed description will be given of main functional portions for detecting a differential pressure of a fluid among all the functional portions constituting the pressure transmitter 100. A detailed description and illustration will not be given of the other functional portions, for example, a signal processing circuit that performs various signal processing operations on the basis of an electric signal corresponding to a pressure detected by the pressure sensor chip 2, and a display device that outputs various pieces of information based on a signal processing result obtained by the signal processing circuit.

The supporting substrate 3 is a substrate for supporting the pressure sensor chip 2 on the diaphragm base 5 and insulating the diaphragm base 5 and the pressure sensor chip 2 from each other. The supporting substrate 3 is, for example, a glass substrate.

The supporting substrate 3 includes through holes 30_1 and 30_2 that extend through a main surface 3a and a main surface 3b opposite to the main surface 3a. The through holes 30_1 and 30_2 are away from each other in a plane direction on the main surfaces 3a and 3b.

The supporting substrate 3 is bonded to the pressure sensor chip 2. Specifically, the main surface 3b of the supporting substrate 3 is bonded to a main surface 20a of the pressure sensor chip 2 in a state where the through hole 30_1 overlaps the pressure introduction channel 111A and the through hole 30_2 overlaps the pressure introduction channel 111B when viewed from a direction perpendicular to the main surface 3a of the supporting substrate 3.

If the pressure sensor chip 2 is made of silicon and if the supporting substrate 3 is made of glass, for example, the main surface 20a of the pressure sensor chip 2 and the main surface 3b of the supporting substrate 3 are bonded to each other by anodic bonding.

The diaphragm base 5 is a base that supports the pressure sensor chip 2 and is made of a metallic material for introducing a pressure of a fluid as a target to be measured to the pressure sensor chip 2. The metallic material may be, for example, stainless steel (SUS).

As illustrated in FIG. 11, the diaphragm base 5 includes a main surface 5a and a main surface 5b opposite to the main surface 5a. The diaphragm base 5 includes two through holes 51_1 and 51_2 that extend through the main surfaces 5a and 5b. As illustrated in FIG. 11, the through holes 51_1 and 51_2 have an opening area that is larger on the main surface 5a than on the main surface S5.

The opening portion on the main surface 5a side of the through hole 51_1 is covered with a diaphragm 50_1 for receiving a pressure from a fluid as a target to be measured. Also, the opening portion on the main surface 5a side of the through hole 51_2 is covered with a diaphragm 50_2 for receiving a pressure from a fluid as a target to be measured. The diaphragms 50_1 and 50_2 are made of, for example, stainless steel (SUS).

Hereinafter, the through holes 51_1 and 51_2 whose one opening portions are covered with the diaphragms 50_1 and 50_2 will be referred to as "fluid pressure introduction holes 51_1 and 51_2", respectively.

As illustrated in FIG. 11, the pressure sensor chip 2 bonded to the supporting substrate 3 is placed and fixed on the main surface 5b side of the diaphragm base 5. Specifically, the pressure sensor chip 2 bonded to the supporting substrate 3 is fixed onto the main surface 5b of the diaphragm 5 by using a fixing member 6B in a state where the through holes 30_1 and 30_2 formed on the main surface 3a of the supporting substrate 3 overlap the fluid pressure introduction holes 51_1 and 51_2 when viewed from the Z direction.

The fixing member 6B is, for example, an epoxy-based adhesive.

On the main surface 5b of the diaphragm base 5, the relay substrate 4 is fixed in a region other than a region where the supporting substrate 3 (pressure sensor chip 2) is bonded. The relay substrate 4 is fixed on the main surface 5b of the diaphragm base 5 by using a fixing member 6A, which is an epoxy-based adhesive, for example.

The relay substrate 4 is a circuit substrate provided with an external terminal for supplying power to a bridge circuit made up of a plurality of pressure-sensitive elements 230_1 and 230_2 (piezoresistance elements) disposed in the above-described pressure sensor chip 2, an external terminal for obtaining electric signals from the above-described bridge circuits, and the like.

Specifically, as illustrate in FIG. 11, the relay substrate 4 is provided with a plurality of electrode pads 40 serving as the foregoing external output terminals disposed on one main surface thereof. The plurality of electrode pads 40 are respectively connected to the electrode pads 129 disposed on a main surface 20b of the pressure sensor chip 2 by using, for example, bonding wires 8 made of a metallic material, such as gold (Au).

The relay substrate 4 is provided with, in addition to the electrode pads 40, a plurality of external output pins (not illustrated) and wiring patterns (not illustrated) for electrically connecting the electrode pads 40 and the external output pins to each other. Accordingly, the pressure sensor chip 2 is electrically connected to the other circuits, such as a signal processing circuit and a power supply circuit, through the electrode pads 129, the bonding wires 8, the electrode pads 40, the wiring patterns, and the external output pins.

The signal processing circuit, the power supply circuit, and so forth may be disposed on the relay substrate 4 or may be disposed on another circuit substrate (not illustrated) connected to the relay substrate 4 through the external output pins.

The fluid pressure introduction holes 51_1 and 51_2 of the diaphragm base 5 respectively communicate with the pressure introduction channels 111A and 111B of the pressure chip sensor 2 through the through holes 30_1 and 30_2 of the supporting substrate 3.

The inside of the fluid pressure introduction holes 51_1 and 51_2 of the diaphragm base 5, the inside of the through holes 30_1 and 30_2 of the supporting substrate 3, and the inside of the pressure introduction channels 111A and 111B of the pressure sensor chip 2 are filled with a pressure transmission material 53. Examples of the pressure transmission material 53 include silicone oil and fluorine oil, like the pressure transmission material 15. Hereinafter, the pressure transmission material 53 is also referred to as "oil 53".

In the process of manufacturing the pressure transmitter 100, the oil 53 is introduced from oil introduction holes 54_1 and 54_2 that communicate with the fluid pressure introduction holes 51_1 and 51_2 disposed in the diaphragm base 5. After the oil 53 is introduced, the oil introduction holes 54_1 and 54_2 are sealed with sealing members 55_1 and 55_2 made of metal (for example, spherical members made of metal), respectively.

4. Operation of Differential Pressure Transmitter

The pressure transmitter 100 having the above-described structure operates in the following manner.

For example, a case is assumed where the pressure transmitter 100 is mounted on a pipeline through which a fluid as a target to be measured flows. In this case, for example, the pressure transmitter 100 is mounted on the pipeline so that a pressure of a fluid on an upstream side (high-pressure side) of the pipeline is detected by the diaphragm 50_1 and that a pressure of a fluid on a downstream side (low-pressure side) of the pipeline is detected by the diaphragm 50_2.

If the pressure of the fluid is applied to the diaphragm 50_1 under this state, the diaphragm 50_1 is displaced. The displacement causes the pressure transmission material 53 to be moved from the fluid pressure introduction hole 51_1 toward the pressure introduction channel 111A of the pressure sensor chip 2. The pressure corresponding to the movement of the pressure transmission material 53 is applied to the diaphragm 124A of the pressure sensor chip 2, and accordingly the diaphragm 124A is displaced.

Also, if the pressure of the fluid is applied to the diaphragm 50_2, the diaphragm 50_2 is displaced. The displacement causes the pressure transmission material 53 to be moved from the fluid pressure introduction hole 51_2 toward the pressure introduction channel 111B of the pressure sensor chip 2. The pressure corresponding to the movement of the pressure transmission material 53 is applied to the diaphragm 124B of the pressure sensor chip 2, and accordingly the diaphragm 124B is displaced.

At this time, since the chambers 132A and 132B facing the pressure introduction channels 111A and 111B with the diaphragms 124A and 124B interposed therebetween communicate with each other through the communication channel 133 and are filled with the oil 15, a pressure corresponding to the movement of the oil 15 caused by displacement of one of the diaphragms 124A and 124B is applied to the other of the diaphragms 124A and 124B through the communication channel 133.

Thus, for example, if the pressure applied from the pressure introduction channel 111A to the diaphragm 124A is higher than the pressure applied from the pressure introduction channel 111B to the diaphragm 124B, the diaphragm 124B is displaced by an amount corresponding to the difference between the two pressures in the −Z direction in FIG. 11 (toward the supporting substrate 3). On the other hand, the diaphragm 124A is displaced by an amount corresponding to the difference between the two pressures in the +Z direction in FIG. 11.

The stress produced in the diaphragms 124A and 124B due to the displacement of the diaphragms 124A and 124B is applied to the strain gauges 125A, 125B, 126A, and 126B, and an electric signal corresponding to a change in the resistance values of the resistors R11 to R14, R21 to R24, and R31 to R34 constituting the respective strain gauges 125A, 125B, 126A, and 126B is output from the pressure sensor chip 2. The electric signal is input to a signal processing circuit (not illustrated), and the signal processing circuit performs necessary signal processing. Accordingly, information about a low differential pressure and a high differential pressure and information about a high static pressure of the fluid as a target to be measured can be obtained, as described above. The information about the differential pressures is displayed on a display device (not illustrated) of the pressure transmitter 100 or is transmitted to an external apparatus through a communication line, for example.

With the pressure transmitter according to the fifth embodiment, with use of the pressure sensor chip according to the fourth embodiment, a differential pressure/static pressure transmitter capable of measuring a low differential pressure, a high differential pressure, and a high static pressure can be commercialized. In particular, with the pressure sensor chip according to the fourth embodiment, a low differential pressure, a high differential pressure, and a high static pressure can be detected by using one chip, and thus a differential pressure/static pressure transmitter can be commercialized at low cost.

Extension of Embodiments

The inventions made by the inventor has been described in detail on the basis of the embodiments. The present disclosure is not limited thereto and may be variously changed without deviating from the gist of the invention.

For example, in the pressure sensor chip 2 according to the fourth embodiment, if a measurement error of pressure based on expansion or contraction of the oil 15 caused by heat does not affect required specifications, all the resistors R11 to R14 may be disposed in either of the diaphragms 124A and 124B.

The pressure sensor chip 2 according to the above-described embodiment is of course applicable to a differential pressure transmitter having various structures, as well as the pressure transmitter 100 having the structure illustrated in FIG. 11. That is, the pressure transmitter 100 described in the above embodiment is merely an example. The pressure sensor chip according to the present disclosure is also applicable to a differential pressure transmitter in which the material and shape of the diaphragm base 5 are different from those in the pressure transmitter 100, depending on the specifications and applications required for the differential pressure transmitter.

In the fifth embodiment, a description has been given of an example of a pressure transmitter including the pressure sensor chip 2 according to the fourth embodiment. Alternatively, a multi-range pressure transmitter including any one of the pressure sensor chips 1, 1A, and 1B according to the first to third embodiments may be commercialized. In this case, a single pressure introduction channel 111 is required for the pressure transmitter, and thus one set of components (for example, the diaphragms 50_1 and 50_2) constituting the channel for introducing a pressure of a fluid as a target to be measured to the pressure introduction channel 111 may be used.

What is claimed is:
1. A pressure sensor chip that detects a pressure of a fluid as a target to be measured, the pressure sensor chip comprising:
a first layer including a first main surface, a second main surface opposite to the first main surface, and a pressure introduction channel that opens on the first main surface and the second main surface;
a second layer including a diaphragm that covers one end of the pressure introduction channel, a first strain gauge, and a second strain gauge, the second layer being disposed on the second main surface of the first layer; and
a third layer including a third main surface and a concaved portion that is disposed at the third main surface, the third main surface being disposed on the second layer, wherein
the concaved portion faces the pressure introduction channel with the diaphragm interposed therebetween,
the concaved portion is disposed on an inner side of the pressure introduction channel when viewed from a direction perpendicular to the first main surface,
the first strain gauge is disposed, in a region functioning as the diaphragm of the second layer, on an outer side of the concaved portion when viewed from the direction perpendicular to the first main surface,
the second strain gauge is disposed, in the region functioning as the diaphragm of the second layer, on an inner side of the first strain gauge when viewed from the direction perpendicular to the first main surface,
the third layer comprises third layers laminated on the second layer, the number of the third layers being n, which is an integer of 2 or more,
the concaved portion of the third layer that is i-th from the second layer has a larger opening area than the concaved portion of the third layer that is (i−1)-th from the second layer, i being larger than 1 and smaller than or equal to n,
the second strain gauge comprises second strain gauges each corresponding to one of the third layers,
the first strain gauge is disposed, in the region functioning as the diaphragm of the second layer, on an outer side of the concaved portion of the third layer that is n-th from the second layer when viewed from the direction perpendicular to the first main surface,
the second strain gauge corresponding to the n-th third layer is disposed, in the region functioning as the diaphragm of the second layer, on an inner side of the first strain gauge and on an outer side of the concaved portion of the third layer that is (n−1)-th from the second layer when viewed from the direction perpendicular to the first main surface,
the second strain gauge corresponding to the third layer that is j-th from the second layer, i being larger than 1 and smaller than n, is disposed, in the region functioning as the diaphragm of the second layer, on an inner side of the second strain gauge corresponding to the third layer that is (j+1)-th from the second layer and on an outer side of the concaved portion of the third layer that is (i−1)-th from the second layer when viewed from the direction perpendicular to the first main surface, and
the second strain gauge corresponding to the third layer that is first from the second layer is disposed, in the region functioning as the diaphragm of the second layer, on an inner side of the second strain gauge corresponding to the third layer that is second from the second layer when viewed from the direction perpendicular to the first main surface.

2. The pressure sensor chip according to claim 1, wherein the second strain gauge corresponding to the third layer that is k-th from the second layer, k being larger than or equal to 1 and smaller than or equal to n, is disposed, in the region functioning as the diaphragm of the second layer, at a peripheral portion of the concaved portion of the k-th third layer when viewed from the direction perpendicular to the first main surface, and the first strain gauge is disposed, in the region functioning as the diaphragm of the second layer, at a peripheral portion of the pressure introduction channel when viewed from the direction perpendicular to the first main surface.

3. The pressure sensor chip according to claim 1, wherein the third layer further includes a hole that communicates with the concaved portion.

4. The pressure sensor chip according to claim 1, wherein the peripheral portion of the pressure introduction channel has an arc-shaped cross section when viewed from a direction parallel to the first main surface.

5. A pressure sensor chip that detects a pressure of a fluid as a target to be measured, the pressure sensor chip comprising:
a first layer including a first main surface, a second main surface opposite to the first main surface, a first pressure introduction channel that opens on the first main surface and the second main surface, and a second pressure introduction channel that opens on the first main surface and the second main surface;
a second layer including a first diaphragm that covers one end of the first pressure introduction channel, a second diaphragm that covers one end of the second pressure introduction channel, a first strain gauge, a second strain gauge, a third strain gauge, and a fourth strain gauge, the second layer being disposed on the second main surface of the first layer; and
a third layer including a third main surface, a fourth main surface opposite to the third main surface, a first concaved portion and a second concaved portion that are disposed at the third main surface, a first communication channel that allows the first concaved portion and the second concaved portion to communicate with each other, and a second communication channel that opens on the fourth main surface and that communicates with the first communication channel, the third main surface being disposed on the second layer, wherein
the first concaved portion faces the first pressure introduction channel with the first diaphragm interposed therebetween,
the second concaved portion faces the second pressure introduction channel with the second diaphragm interposed therebetween,
the first strain gauge is disposed, in a region functioning as the first diaphragm of the second layer, on an outer side of the first concaved portion when viewed from a direction perpendicular to the first main surface,
the second strain gauge is disposed, in the region functioning as the first diaphragm of the second layer, on an inner side of the first strain gauge when viewed from the direction perpendicular to the first main surface,
the third strain gauge is disposed, in a region functioning as the second diaphragm of the second layer, on an outer side of the second concaved portion when viewed from the direction perpendicular to the first main surface, and
the fourth strain gauge is disposed, in the region functioning as the second diaphragm of the second layer, on an inner side of the third strain gauge when viewed from the direction perpendicular to the first main surface.

6. A pressure transmitter comprising:
the pressure sensor chip according to claim 5;
a base including a fifth main surface, a sixth main surface opposite to the fifth main surface, a first fluid pressure introduction hole that opens on the fifth main surface and the sixth main surface, and a second fluid pressure introduction hole that opens on the fifth main surface and the sixth main surface;
a third diaphragm that is disposed on the fifth main surface of the base and that covers one end of the first fluid pressure introduction hole;
a fourth diaphragm that is disposed on the fifth main surface of the base and that covers one end of the second fluid pressure introduction hole; and
a supporting substrate including a seventh main surface, an eighth main surface opposite to the seventh main surface, a first through hole that opens on the seventh main surface and the eighth main surface, and a second through hole that opens on the seventh main surface and the eighth main surface, the supporting substrate supporting the pressure sensor chip with the seventh main surface being fixed on the base and the eighth main surface being bonded to the first main surface of the first layer, wherein
the first fluid pressure introduction hole and the first through hole communicate with each other, and
the second fluid pressure introduction hole and the second through hole communicate with each other.

7. A pressure sensor chip that detects a pressure of a fluid as a target to be measured, comprising:
a first layer including a first main surface, a second main surface opposite to the first main surface, and a pressure introduction channel that extends through the first main surface and the second main surface;
a second layer that includes a first strain gauge, that is disposed on the second main surface of the first layer so as to cover one end of the pressure introduction channel, and that includes a region functioning as a diaphragm, the region overlapping the pressure introduction channel when viewed from a direction perpendicular to the first main surface; and
third layers laminated on the second layer, the number of the third layers being n, which is an integer of 2 or more, wherein
each of the n third layers includes
a third main surface and a fourth main surface opposite to the third main surface,
a concaved portion disposed at the third main surface, and
a second strain gauge disposed on the fourth main surface side,
in the third layer that is first from the second layer, the third main surface is bonded to the second layer, and the concaved portion is disposed on an inner side of the pressure introduction channel when viewed from the direction perpendicular to the first main surface,
in the third layer that is i-th from the second layer, i being larger than 1 and smaller than or equal to n, the third main surface is bonded to the fourth main surface of the third layer that is (i−1)-th from the second layer, the concaved portion of the i-th third layer has a larger opening area than the concaved portion of the (i−1)-th third layer when viewed from the direction perpendicular to the first main surface, the second strain gauge of the third layer that is n-th from the second layer is disposed on an outer side of the concaved portion of the n-th third layer when viewed from the direction perpendicular to the first main surface, the second strain gauge of the third layer that is j-th from the second layer, j being larger than or equal to 1 and smaller than n, is disposed on an outer side of the concaved portion of the j-th third layer and on an inner side of the second strain gauge of the third layer that is (j+1)-th from the second layer when viewed from the direction perpendicular to the first main surface, and the first strain gauge is disposed on an inner side of the second strain gauge of the first third layer when viewed from the direction perpendicular to the first main surface.

\* \* \* \* \*